US010355569B2

(12) United States Patent
Tremblay-Simard et al.

(10) Patent No.: US 10,355,569 B2
(45) Date of Patent: Jul. 16, 2019

(54) CORE FOR TRANSVERSE FLUX ELECTRICAL MACHINE

(71) Applicant: EOCYCLE TECHNOLOGIES INC., Montreal (CA)

(72) Inventors: Raphael Tremblay-Simard, Montreal (CA); Raphael Nadeau, Longueuil (CA); Patrice Fortin, Gaspé (CA)

(73) Assignee: Eocycle Technologies Inc., Montreal, Quebec (CA)

( * ) Notice: Subject to any disclaimer, the term of this patent is extended or adjusted under 35 U.S.C. 154(b) by 290 days.

(21) Appl. No.: 15/214,159

(22) Filed: Jul. 19, 2016

(65) Prior Publication Data
US 2017/0025906 A1 Jan. 26, 2017

Related U.S. Application Data

(60) Provisional application No. 62/194,352, filed on Jul. 20, 2015.

(51) Int. Cl.
| H02K 21/14 | (2006.01) |
| H02K 1/06 | (2006.01) |
| H02K 1/14 | (2006.01) |
| H02K 1/18 | (2006.01) |
| H02K 21/26 | (2006.01) |
| H02K 21/12 | (2006.01) |
| H02K 53/00 | (2006.01) |

(52) U.S. Cl.
CPC ............. *H02K 21/145* (2013.01); *H02K 1/06* (2013.01); *H02K 1/141* (2013.01); *H02K 1/185* (2013.01); *H02K 1/145* (2013.01); *H02K 1/18* (2013.01); *H02K 21/12* (2013.01); *H02K 21/14* (2013.01); *H02K 21/26* (2013.01); *H02K 53/00* (2013.01)

(58) Field of Classification Search
CPC .......... H02K 1/06; H02K 1/141; H02K 1/145; H02K 1/18; H02K 1/185; H02K 21/12; H02K 21/14; H02K 21/145; H02K 21/26; H02K 21/53
USPC ............................................ 310/156.02, 179
See application file for complete search history.

(56) References Cited

U.S. PATENT DOCUMENTS

| 4,347,449 A * | 8/1982 | Beau .................. F16C 32/0461 174/DIG. 21 |
| 6,188,159 B1 * | 2/2001 | Fan ....................... H02K 1/141 310/216.026 |
| 6,949,855 B2 * | 9/2005 | Dubois .................. H02K 1/278 310/12.21 |
| 2007/0013253 A1 * | 1/2007 | Dubois .................. H02K 1/145 310/156.02 |

(Continued)

*Primary Examiner* — Julio C. Gonzalez
*Assistant Examiner* — Rashad H Johnson
(74) *Attorney, Agent, or Firm* — Mathieu Audet

(57) ABSTRACT

A transverse flux electrical machine comprising a rotor portion and a stator portion is presented, the stator portion comprising a plurality of cores for use in conjunction with the rotor, each of the plurality of cores comprising a plurality of ferromagnetic sheet material layers substantially bent in a "U" configuration and stacked one on top of the other, a surface of each sheet material layer being substantially parallel with a core axis of the "U" configuration for reducing eddy currents therein and a pair of legs including, respectively, a reduction portion along the legs, toward a pair of poles thereof.

20 Claims, 24 Drawing Sheets

(56) References Cited

U.S. PATENT DOCUMENTS

| | | | | |
|---|---|---|---|---|
| 2013/0113320 A1* | 5/2013 | Calley | ............... | H02K 21/145 310/156.02 |
| 2015/0048708 A1* | 2/2015 | Nord | ................ | H02K 21/145 310/156.56 |
| 2015/0162786 A1* | 6/2015 | Janecek | ............... | H02K 1/145 310/44 |
| 2015/0369252 A1* | 12/2015 | Janecek | ............. | H02K 21/145 417/420 |

* cited by examiner

CORE FOR TRANSVERSE FLUX ELECTRICAL MACHINE

CROSS-REFERENCES

The present invention relates to, claims priority from and is a division application of U.S. Patent Provisional Application No. 62/194,352, filed, Jul. 20, 2015, entitled C-CORE FOR ELECTRICAL MACHINE, this document is incorporated herein by reference in its entirety.

BACKGROUND OF THE INVENTION

1. Field of the Invention

This invention relates generally to transverse flux electrical machines. The present invention more specifically relates to a core for transverse flux alternators and assembly thereof.

2. Description of the Related Art

Alternators and motors are used in a variety of machines and apparatuses to produce electricity from mechanical movements. They find applications for energy production and transportation, to name a few. Alternators and motors can use Transverse Flux Permanent Magnet (TFPM) technologies.

Transverse flux machines with permanent magnet excitation are known from the literature, such as the dissertation by Michael Bork, *Entwicklung und Optimierung einer fertigungsgerechten Transversalflußmaschine* [Developing and Optimizing a Transverse Flux Machine to Meet Production Requirements], Dissertation 82, RWTH Aachen, Shaker Verlag Aachen, Germany, 1997, pages 8 if. The circularly wound stator winding is surrounded by U-shaped soft iron cores (yokes), which are disposed in the direction of rotation at the spacing of twice the pole pitch. The open ends of these U-shaped cores are aimed at an air gap between the stator and rotor and form the poles of the stator. Facing them, permanent magnets and concentrators are disposed in such a way that the magnets and concentrators that face the poles of a stator core have the opposite polarity. To short-circuit the permanent magnets, which in the rotor rotation are intermittently located between the poles of the stator and have no ferromagnetic short circuit, short-circuit elements are disposed in the stator.

Put otherwise, transverse flux electrical machines include a circular stator and a circular rotor, which are separated by an air space called air gap, that allows a free rotation of the rotor with respect to the stator, and wherein the stator comprises soft iron cores, that direct the magnetic flux in a direction that is mainly perpendicular to the direction of rotation of the rotor. The stator of transverse flux electrical machines also comprises electrical conductors, defining a toroid coil, which is coiled in a direction that is parallel to the direction of rotation of the machine. In this type of machine, the rotor comprises a plurality of identical permanent magnet parts, which are disposed so as to create an alternated magnetic flux in the direction of the air gap. This magnetic flux goes through the air gap with a radial orientation and penetrates the soft iron cores of the stator, which directs this magnetic flux around the electrical conductors.

In the transverse flux electrical machine of the type comprising a rotor, which is made of a plurality of identical permanent magnet parts, and of magnetic flux concentrators, the permanent magnets are oriented in such a manner that their magnetization direction is parallel to the direction of rotation of the rotor. Magnetic flux concentrators are inserted between the permanent magnets and redirect the magnetic flux produced by the permanent magnets, radially towards the air gap.

The transverse flux electrical machine includes a stator, which comprises horseshoe-shaped like soft iron cores, which are oriented in such a manner that the magnetic flux that circulates inside these cores, is directed in a direction that is mainly perpendicular to the axis of rotation of the rotor.

The perpendicular orientation of the magnetic flux in the cores of the stator, with respect to the rotation direction, gives to transverse flux electrical machines a high ratio of mechanical torque per weight unit of the electrical machine. Eddy currents influence the magnetic efficiency.

Eddy currents (also called Foucault currents) are circular electric currents induced within conductors by a changing magnetic field in the conductor, due to Faraday's law of induction. Eddy currents flow in closed loops within conductors, in planes perpendicular to the magnetic field. They can be induced within nearby stationary conductors by a time-varying magnetic field created by an AC electromagnet or transformer, for example, or by relative motion between a magnet and a nearby conductor. The magnitude of the current in a given loop is proportional to the strength of the magnetic field, the area of the loop, and the rate of change of flux, and inversely proportional to the resistivity of the material.

By Lenz law, an eddy current creates a magnetic field that opposes the magnetic field that created it, and thus eddy currents react back on the source of the magnetic field. For example, a nearby conductive surface will exert a drag force on a moving magnet that opposes its motion, due to eddy currents induced in the surface by the moving magnetic field. This effect is employed in eddy current brakes, which are used to stop rotating power tools quickly when they are turned off. The current flowing through the resistance of the conductor also dissipates energy as heat in the material hence having an adverse effect on electrical machines efficiency. Thus eddy currents are a source of energy loss in alternating current (AC) inductors, transformers, electric motors and generators, and other AC machinery, requiring special construction such as laminated magnetic cores to minimize them.

Cores made of a stack of sheet material radially laminated and angularly stacked along the coil of the TFEM is channeling the flux therein while producing circular eddy currents in the lamination plane that are not restrained in the thickness of the lamination. The purpose of stacking laminated sheet material is to decrease the eddy current losses, which is not the case when the motor is in the unaligned positon. The coil needs to be more massive to compensate the lower global efficiency of the TFEM by reducing the Joules losses (conducting losses). The cores housing, that is not laminated, is also more complex to manufacture and assemble to hold each core stack together during the assembly of the stator and part of the magnetic flux is loss to the housing when the magnetic concentrators are in the unaligned position. Other detrimental issues are occurring when honing the stator's interior like a separation of the laminated sheets cores.

It is therefore desirable to provide a core design that is minimizing eddy currents. It is desirable to produce a core for an electrical machine that is easy to assemble. It is also desirable to provide a core for an electrical machine that is economical to produce. Other deficiencies will become apparent to one skilled in the art to which the invention

SUMMARY OF THE INVENTION

Figure 1:
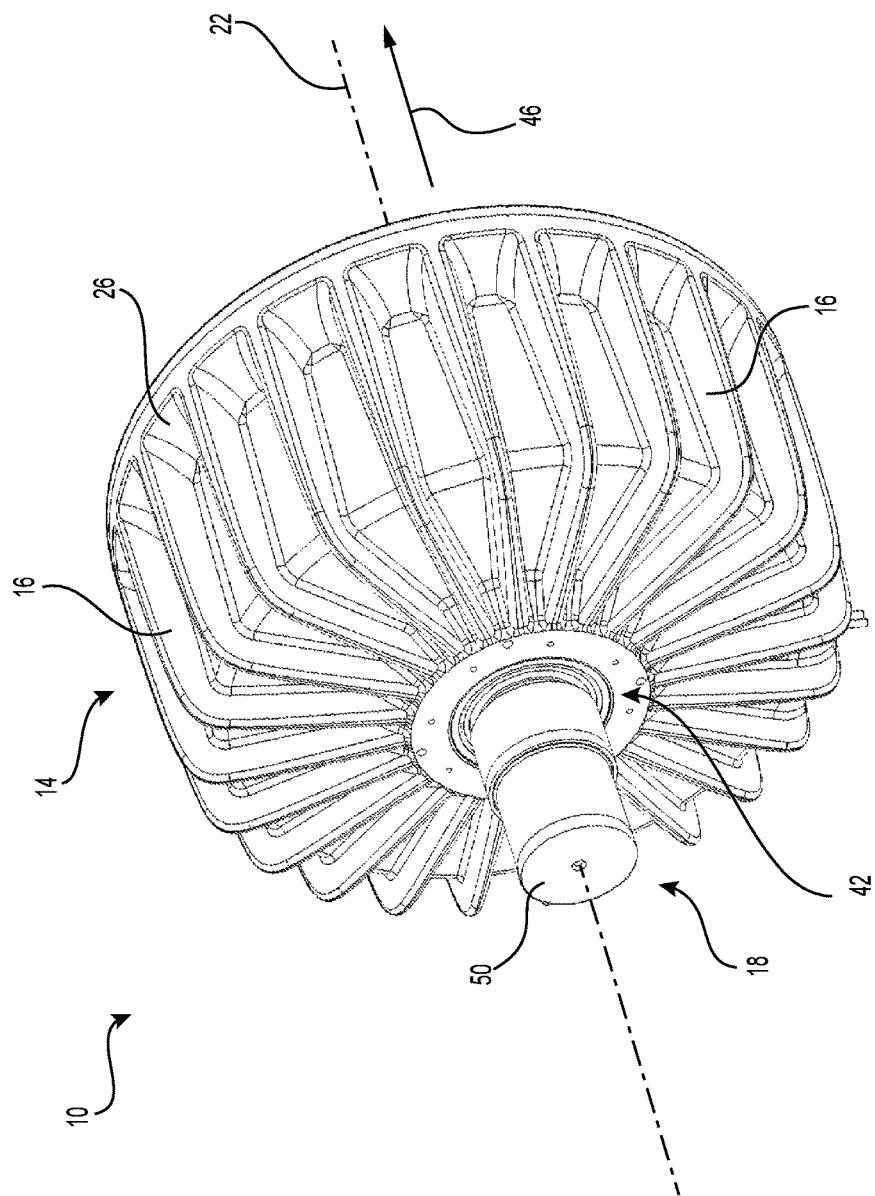
FIG. 1 is an isometric view of a TFEM, in accordance with at least one embodiment of the invention.

It is one aspect of the present invention to alleviate one or more of the shortcomings of background art by addressing one or more of the existing needs in the art.

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

Generally, an object of the present invention provides a core for a Transverse Flux Electrical Machine (TFEM), which can also be more specifically appreciated as Transverse Flux Permanent Magnet Machine (TFPMM) although TFEM is going to be used below to facilitate reading of the text.

An object of the invention, in accordance with at least one embodiment thereof, is generally described as a core structure for a TFEM.

Generally, an object of the invention, in accordance with at least one embodiment thereof, provides a laminated core for assembly in a TFEM that minimizes the eddy current therein.

An object of the invention, in accordance with at least one embodiment thereof, provides a core for a TFEM that is laminated in the direction parallel to the magnetic field when operatively secured in the TFEM; the flux passes through the core poles parallel to the laminations plane orientation of the laminations in the unaligned position.

An object of the invention, in accordance with at least one embodiment thereof, provides a core that is laminated in a direction partially circling the coil when assembled in a TFEM.

An object of the invention, in accordance with at least one embodiment thereof, provides a core that is laminated in a direction partially circling the coil when assembled in a TFEM with an angled portion on the core's legs and a pair of poles of a reduced section.

An object of the invention, in accordance with at least one embodiment thereof, provides a more efficient laminated core that allows for a smaller coil in the TFEM that requires less copper thereof.

An object of the invention, in accordance with at least one embodiment thereof, provides a laminated core that avoids a lamination of independent sheets stack that has to be bent with different radiuses to achieve a symmetrical sheet stack for the two core poles to have a pole pitch separation distance.

One object of the invention, in accordance with at least one embodiment thereof, provides a core made from cold electrical strip rolled around a rectangular tub, then varnished with the mold to prevent the rolled strip to unroll. The rolled strip is then cut in two symmetrical parts to obtain two cores and each pole of the core is cut to get the required pole pitch shift between the pair of poles.

One object of the invention, in accordance with at least one embodiment thereof, provides a core for a TFEM that is composed of a laminated steel sheets and maintains a lower operating temperature when in operation in the TFEM.

An object of the invention, in accordance with at least one embodiment thereof, provides a core manufactured with a cold electrical steel strip rolled around a spacer of a shape and size adapted to accommodate therein a coil.

Another object of the invention, in accordance with at least one embodiment thereof, provides a core for a TFEM that is laminated in a "U" shape with a plurality of superposed "U" shaped sheet portion.

An aspect of the invention, in accordance with at least one embodiment thereof, provides a core made of rolled sheet material having non-conductive varnished applied on a surface thereof.

One aspect of the invention, in accordance with at least one embodiment thereof, provides a core made of rolled sheet material using non-conductive varnished to secure together the plurality of superposed layers of rolled sheet material.

An aspect of the invention, in accordance with at least one embodiment thereof, provides a core for a TFEM that is laminated in a configuration adapted to contain the eddy currents in the thickness of the steel sheet when operating in the TFEM.

One other aspect of the invention, in accordance with at least one embodiment thereof, provides a pair of cores simultaneously manufactured with a unique rolled strip of cold electrical steel cut in two.

One aspect of the invention, in accordance with at least one embodiment thereof, provides core that are etched to prevent conductivity between adjacent layers of steel sheets.

One aspect of the invention, in accordance with at least one embodiment thereof, provides a core having reduced sections abutting operatively facing concentrators when operatively secured in the TFEM.

Another aspect of the invention, in accordance with at least one embodiment thereof, provides a core pole pitch shift provided by reduced sections operatively facing corresponding concentrators when operatively secured in the TFEM.

Another aspect of the invention, in accordance with at least one embodiment thereof, provides a core with angled surfaces on each leg to provide a pole pitch shift.

An aspect of the invention, in accordance with at least one embodiment thereof, provides a steel sheet laminating direction that is more resistant to delamination when machining and honing the core sections operatively facing corresponding concentrators when operatively secured in the TFEM.

One other aspect of the invention, in accordance with at least one embodiment thereof, provides TFEM halves for receiving, securing and locating cores in their respective operating locations in a TFEM.

Another aspect of the invention, in accordance with at least one embodiment thereof, provides an assembly using the shape of the core to radially locate the core in respect with the TFEM's axis of rotation.

One aspect of the invention, in accordance with at least one embodiment thereof, provides smaller halves for securing and locating a plurality of cores therein given the lower eddy current generated by the cores.

One aspect of the invention, in accordance with at least one embodiment thereof, provides a transverse flux electrical machine comprising a rotor portion and a stator portion, the stator portion comprising a plurality of cores for use in conjunction with the rotor, each of the plurality of cores comprising a plurality of ferromagnetic sheet material layers substantially bent in a "U" configuration and stacked one on top of the other, a surface of each sheet material layer being substantially parallel with a core axis of the "U" configuration, and a pair of legs including, respectively, a reduction portion along the legs, toward a pair of poles thereof.

Embodiments of the present invention each have at least one of the above-mentioned objects and/or aspects, but do not necessarily have all of them. It should be understood that some aspects of the present invention that have resulted from attempting to attain the above-mentioned objects may not satisfy these objects and/or may satisfy other objects not specifically recited herein.

Additional and/or alternative features, aspects, and advantages of embodiments of the present invention will become apparent from the following description, the accompanying drawings, and the appended claims.

DESCRIPTION OF EMBODIMENT(S) OF THE INVENTION

Our work is now described with reference to the Figures. In the following description, for purposes of explanation, numerous specific details are set forth in order to provide a thorough understanding of the present invention by way of embodiment(s). It may be evident, however, that the present invention may be practiced without these specific details. In other instances, when applicable, well-known structures and devices are shown in block diagram form in order to facilitate describing the present invention.

Figure 2:
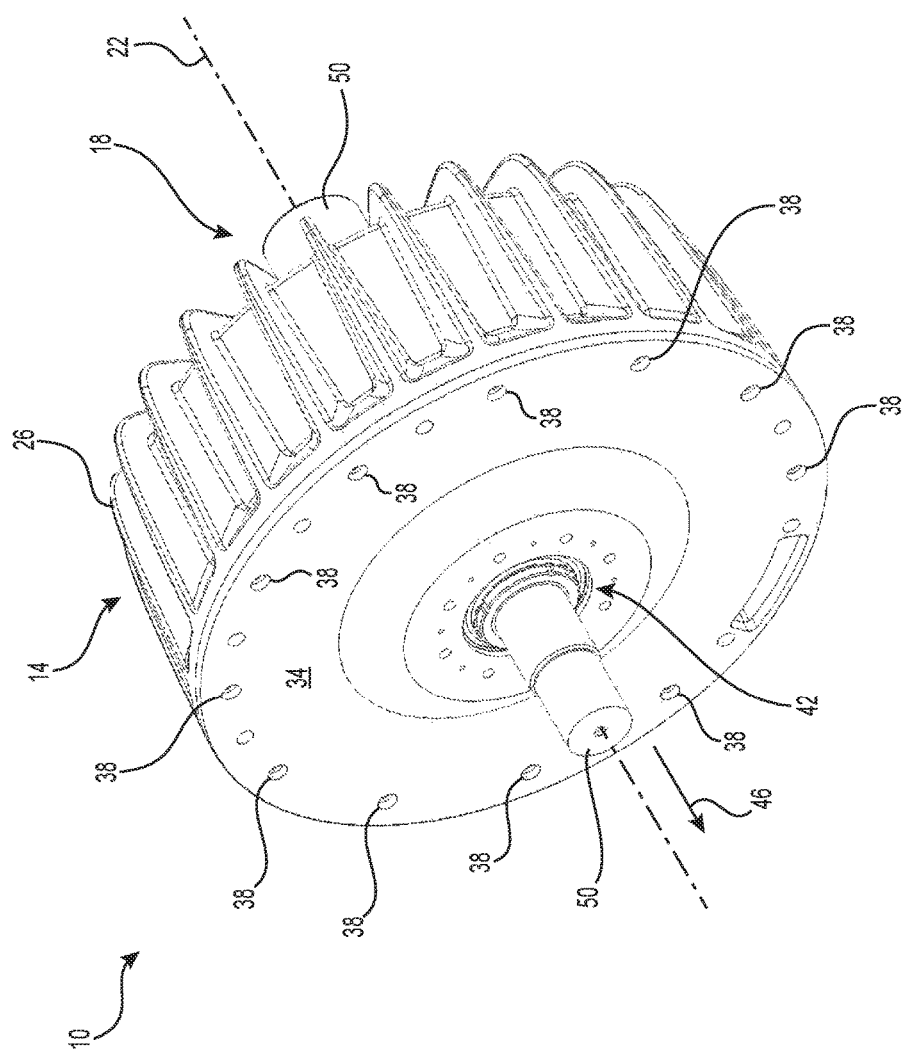
FIG. 2 is an isometric view of a TFEM, in accordance with at least one embodiment of the invention.
Figure 3:
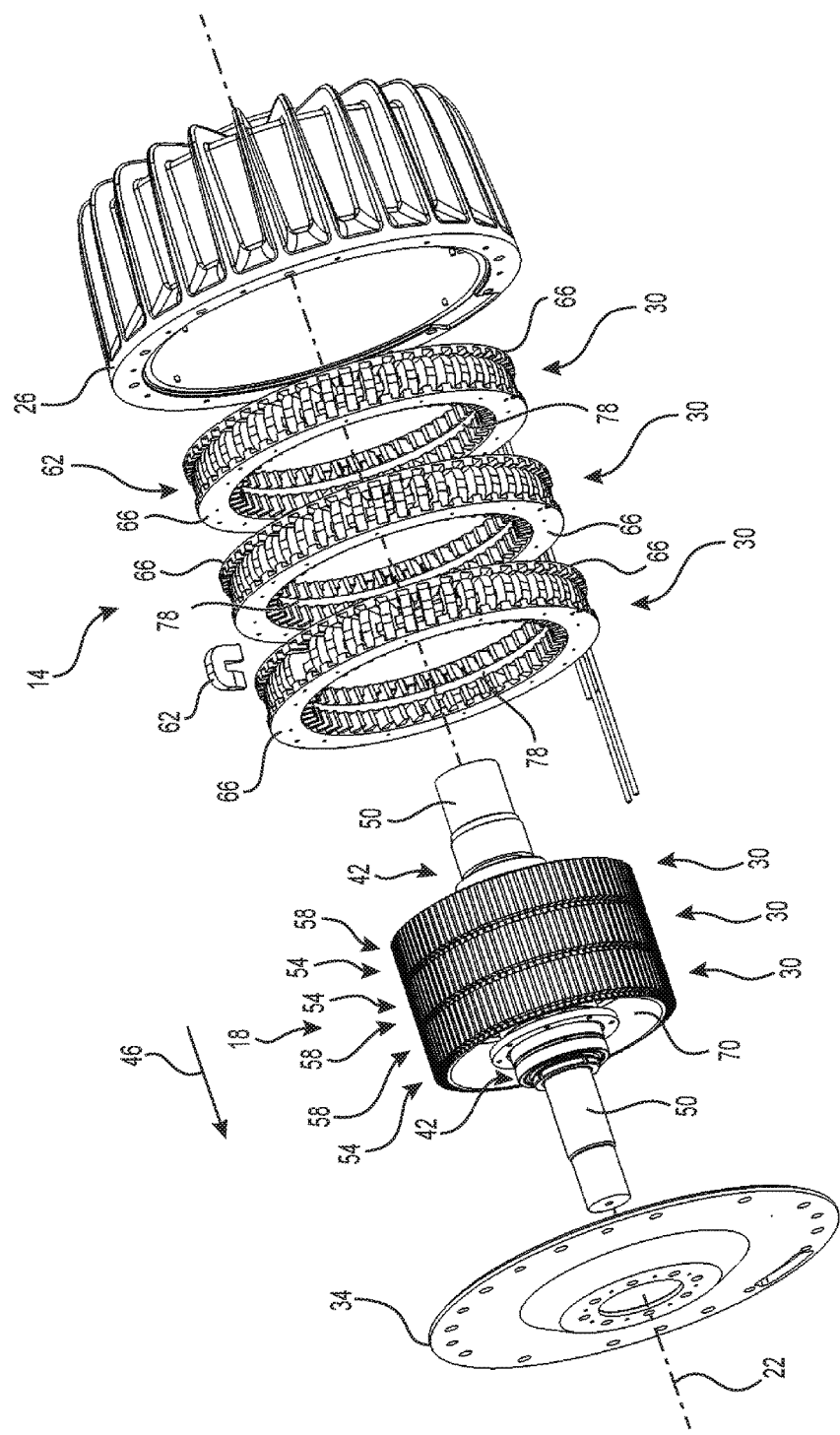
FIG. 3 an isometric exploded view of a TFEM in accordance with at least one embodiment of the invention.

A TFEM 10 is illustrated in FIG. 1 through FIG. 3. The TFEM 10 includes a stator portion 14 and a rotor portion 18. The stator portion 14 is adapted to remain fixed while the rotor portion 1, located within the stator portion 14, is adapted to rotate in respect with the stator portion 14 about rotation axis 22 thereof. The illustrated stator portion 14 is equipped with an array of fins 16 radially protruding from the housing 26 to help increase the heat exchange between the housing 26 and the environment. The embodiments illustrated below depict a TFEM 10 with an exemplary number of pairs of poles and an exemplary 635 mm (25 inches) diameter at the air gap is for illustrative purposes in the context of the invention. The configuration of the illustrated TFEM 10 includes an internal rotor portion 18 and an external stator portion 14. An alternate embodiment could use an external rotor portion 18 instead of an internal rotor portion 18. The number of phases can change in accordance with the specific application, the desired power output, torque and rotational speed could vary without departing from the scope of the present invention.

The TFEM of the illustrated embodiments includes a housing 26 adapted to receive therein, for example, three phase modules 30. An axial side member 34 is secured to the housing 26 to hold therein the three assembled electrical phase modules 30 inside the housing 26. Each phase module 30 is adapted to individually provide an electrical phase of alternating current. The present embodiment illustrates three phases 30 axially coupled together to provide tri-phased current when the TFEM 10 is rotatably actuated. In the present embodiment, the axial side member 34 is secured to the housing 26 with a series of fasteners (not illustrated) engaging threaded holes 38.

The axial side member 34 and the housing 26 are configured to receive and secure thereto a bearing assembly 42. The bearing assemblies 42 rotatably secure and concentrically locate the rotor portion 18 in respect with the stator portion 14. The actual configuration of the embodiment illustrated in FIG. 1 throughout FIG. 3 allows removal of the rotor portion 18 in one axial direction 46 when the axial side member 34 is unsecured from the housing 26. This allows for easy maintenance of the TFEM 10 once installed in its operating configuration.

As it is also possible to appreciate from the embodiment illustrated in FIG. 1 throughout FIG. 3 a solid drive member 50 of the rotor portion 18 that rotatably engages and extends through the axial side member 34, on one axial side, and rotatably extends through the housing 26 on the opposite axial side. The solid drive member 50 could alternatively be a hollowed drive member in other unillustrated embodiments. The drive member 50 is adapted to transmit rotatable motive power from an external mechanism (not illustrated) to the TFEM 10. The external mechanism (not illustrated) could, for example, be a windmill rotatable hub (not illustrated) to which the rotor blades (not illustrated) are secured to transmit rotational motive power to the TFEM 10. The external mechanism expressed above is a non-limitative example and other external mechanisms adapted to transmit rotational motive power to the TFEM 10 are considered to remain within the scope of the present application.

Focusing now on FIG. 3 that is illustrating a semi-exploded view of the TFEM 10 where a skilled reader can appreciate the rotor portion 18 is axially extracted from the stator portion 14. The rotor portion 18 is axially extracted from the stator portion 14 by removing the axial side member 34 from the housing 26. It can be appreciated that the rotor portion 18 of the exemplary embodiment has three distinct axial phase modules 30, each providing an electrical phase, adapted to axially align and operatively cooperate with the three phase modules 30 of the exemplified stator portion 14. The rotor portion 18 includes a plurality of alternated magnets 54 and concentrators 58 that are disposed parallel with the rotation axis 22. Pluralities of cores 62 are held and located between a pair of aluminum support halve members 66 from which a plurality of pairs of poles 118 are radially and proximally extending therefrom.

As indicated above, the rotor portion 18 is adapted to rotate in respect with the stator portion 14. The speed of rotation can differ depending of the intended purpose. Power remains function of the torque and the rotation speed of the rotor portion 18. Therefore, the TFEM is going to produce more power if the TFEM rotates rapidly as long as its operating temperature remains in the operating range of its different components to prevent any deterioration thereof (e.g. magnet demagnetization or insulating vanish deterioration, to name a few). The axial side member 34 is adapted to be unsecured from the housing 26 for inspection and maintenance. FIG. 3 also illustrates that each phase module 30 of the rotor 18 uses a sequence of individual alternated permanent magnet 54 and concentrator 58. Strong permanent magnets 54 can be made of Nb—Fe—B as offered by Hitachi Metals Ltd and NEOMAX Co. Ltd. Alternatively, suitable magnets can be obtained by Magnequench Inc. and part of this technology can be appreciated in U.S. Pat. Nos. 5,411,608, 5,645,651, 6,183,572, 6,478,890, 6,979,409 and 7,144,463.

Each phase module 30 is going to be discussed in more details below. However, a positioning mechanism is provided to angularly locate each phase module 30 in respect with its adjacent phase module 30 so that proper phase shift is maintained. Generally, the phase shift is set at 120° electrical to provide standard symmetrical electric current overlapping over a complete 360° electrical cycle. The 120° phase shift allows to, in theory, eliminate harmonics that are not multiples of three (3). The 120° phase shift illustrated herein is a preferred embodiment and is not intended to limit the angular phase shift of the present invention.

The illustrative embodiment of FIG. 3 includes three (3) phase modules 30. Another possible embodiment includes a multiple of three (3) phase modules 30 mechanically secured together and electrically connected by phase to increase the capacity of the TFEM 10 by simply increasing the axial length of the TFEM 10. Thus, a nine (9) phase modules 30 would be coupled three-by-three for a "triple" three-phased 30 TFEM 10. Another possible embodiment is a one-phase 30 TFEM 10 including only one phase module 30. One other possible embodiment could be a two-phased TFEM 10 electrically coupled together in a one-phase 30 configuration and with a phase shift of 90° electrical in a two-phase 30 configuration.

The rotor portion 18 includes a cylindrical support frame 70 preferably removably secured to the rotatable drive member 50. As explained above, the cylindrical support frame 70 is sized and designed to accommodate three electrical phases, each provided by a phase module 30 including its alternate series of magnets 54 and concentrators 58 secured thereon. The circular stator portion 14 and the circular rotor portion 18 are separated by an air space called "air gap" 74 that allows an interference-free rotation of the rotor portion 18 with respect to the stator portion 14. Generally, the smallest is the air gap 74 the most performance the TFEM is going to provide. The air gap 74 is however limited to avoid any mechanical interference between the stator portion 14 and the rotor portion 18 and is also going to be influenced by manufacturing and assembly tolerances in addition to thermic expansion of the parts when the TFEM 10 is actuated. The stator portion 14 comprises soft iron cores 62 (C-cores) that direct the magnetic flux in a direction that is mainly perpendicular to the direction of rotation of the rotor portion 18. The stator portion 14 of TFEM 10 also comprises in each phase module 30 electrical conductors defining a toroid coil 78 that is coiled in a direction that is parallel to the direction of rotation of the TFEM 10. In this embodiment, the rotor portion 18 comprises a plurality of identical permanent magnets 54, which are disposed so as to create an alternated magnetic flux in the direction of the air gap 74. This magnetic flux goes through the air gap 74 with a radial orientation and penetrates the soft iron cores 62 of the stator portion 14, which directs this magnetic flux around the toroid coil 78.

In the TFEM 10 of the type comprising a rotor portion 18 including a plurality of identical permanent magnets 54 and of magnetic flux concentrators 58, the permanent magnets 54 are oriented in such a manner that their magnetization direction is parallel to the direction of rotation of the rotor portion 18, along rotation axis 22. Magnetic flux concentrators 58 are disposed between the permanent magnets 54 and redirect the magnetic flux produced by the permanent magnets 54 radially towards the air gap 74. In contrast, the stator portion 14 comprises "horseshoe-shaped" soft iron cores 62, which are oriented in such a manner that the magnetic flux that circulates inside these cores 62 is directed in a direction that is mainly perpendicular to the direction of rotation of the rotor portion 18. The perpendicular orientation of the magnetic flux in the cores 62 of the stator portion 14, with respect to the rotation direction, gives to TFEM a high ratio of mechanical torque per weight unit of the electrical machine.

Figure 4:
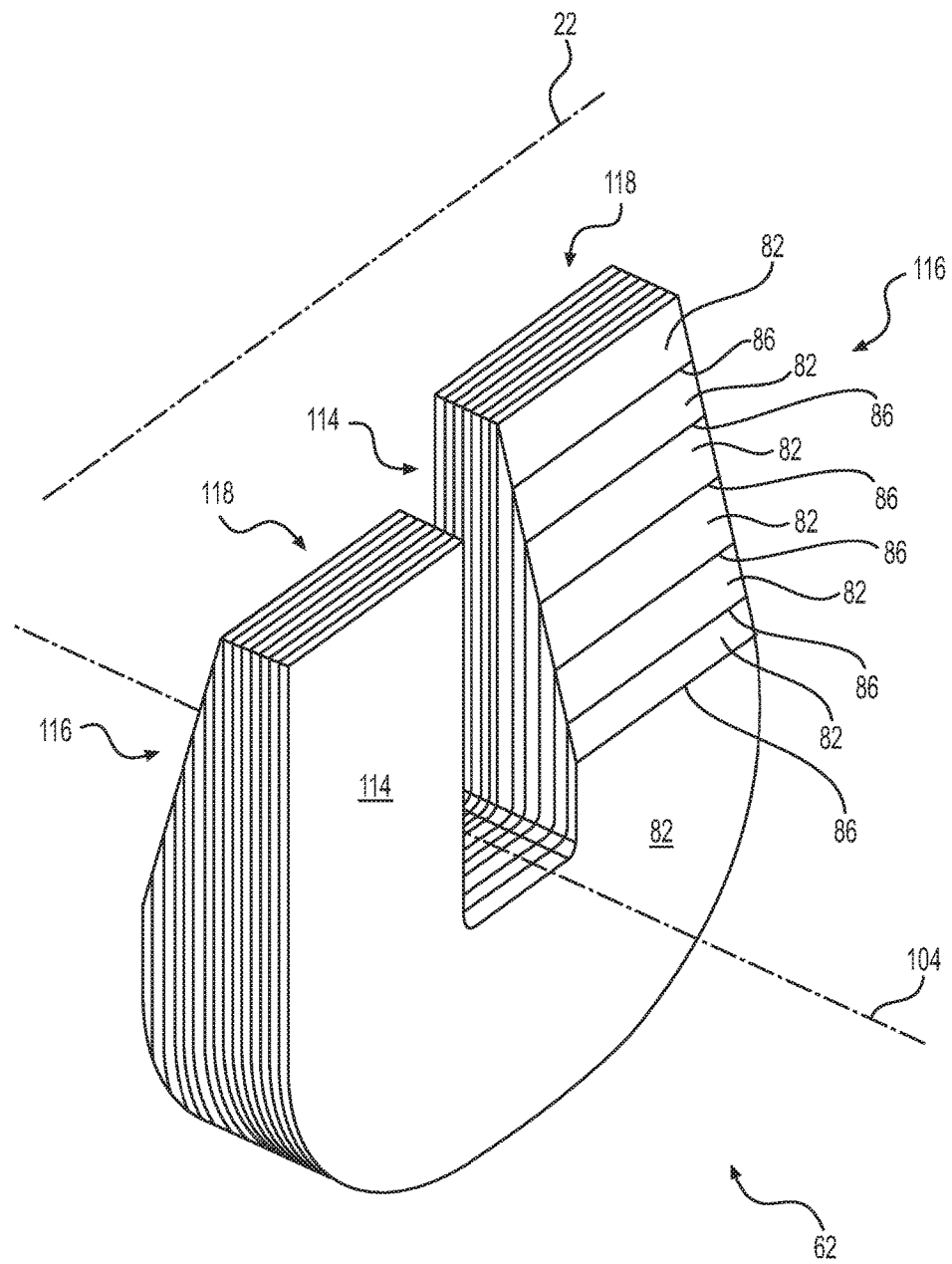
FIG. 4 is an isometric view of a prior art core.
Figure 5:
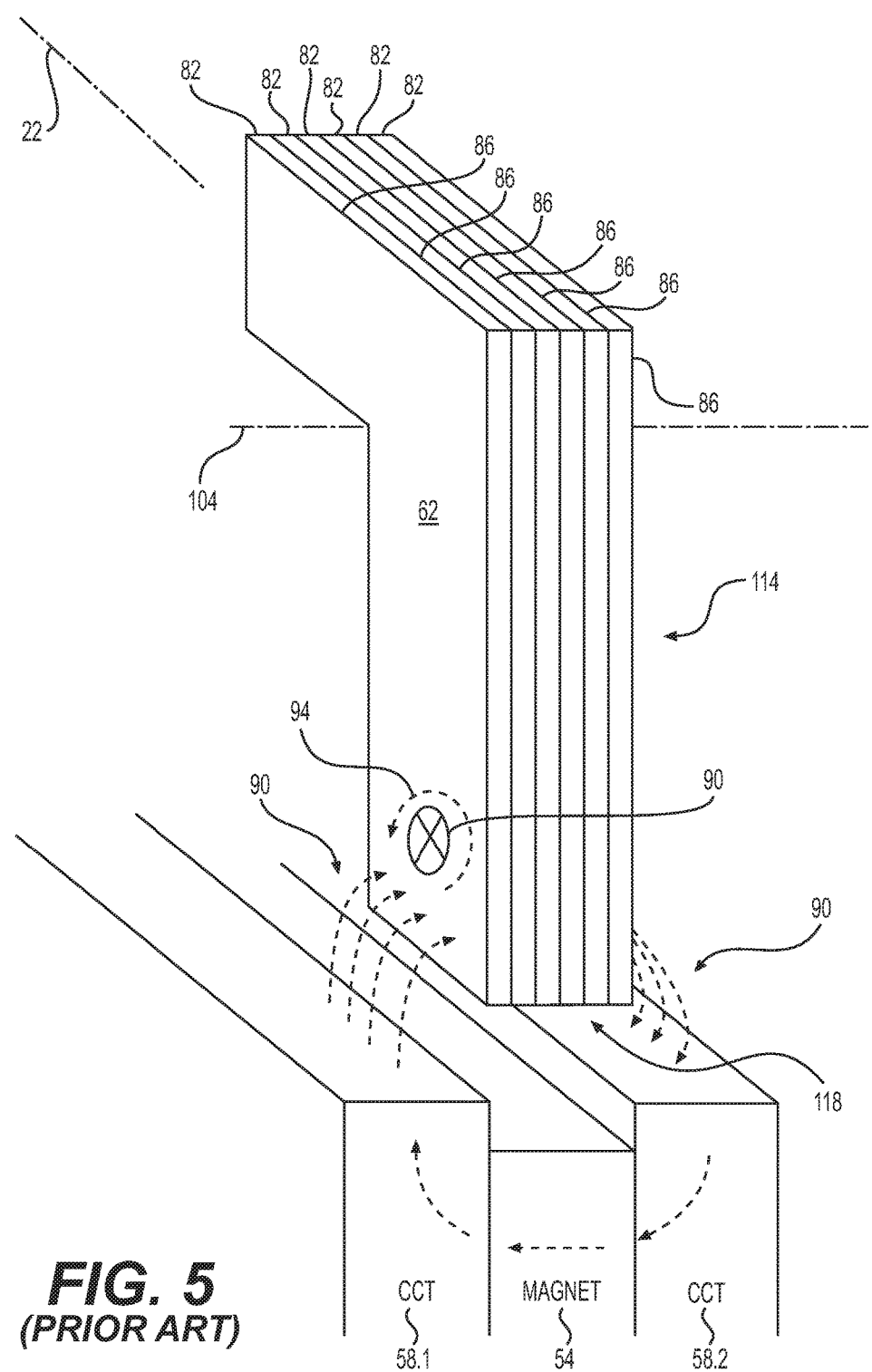
FIG. 5 is an isometric view of an illustration of the magnetic flux of a prior art core.
Figure 6:
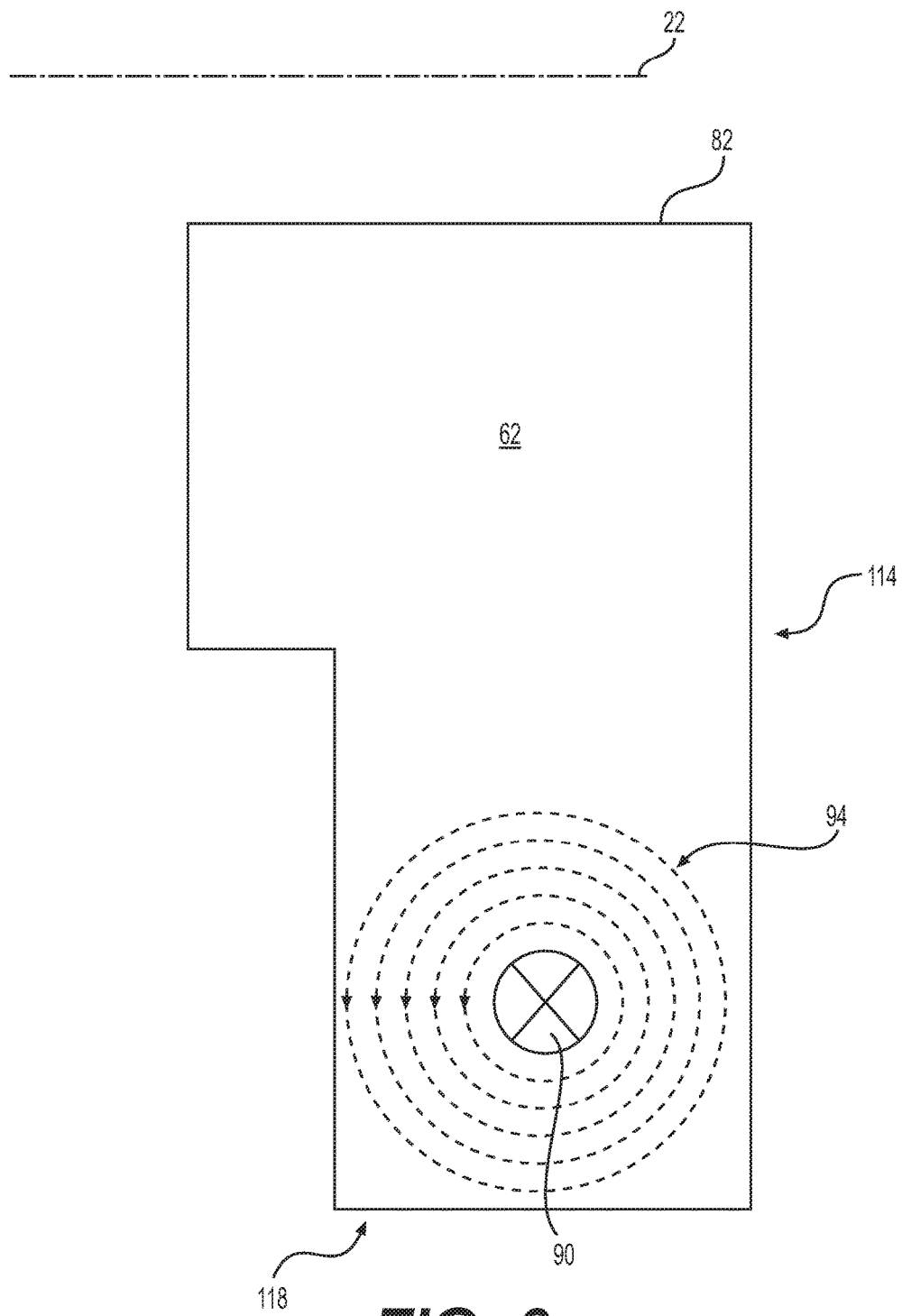
FIG. 6 is an isometric view of an illustration of the Eddy currents flow of a prior art core.

FIG. 4 illustrates a prior art core 62 manufactured with a plurality of superposed sheets of metal 82 that are bent and separated with insulating layers 86. The sheets of metal 82 are stacked in a plane adapted to be parallel with the axis of rotation 22 when the core 62 is operatively assembled in the TFEM. The magnetic flux 90 exits from the concentrator 58.1 in a direction orthogonal to the surface of the plurality of superposed sheets of metal 82 as illustrated in FIG. 5. The Eddy currents 94 flow in closed loops within the conductors, in planes perpendicular to the magnetic field 90 and perpendicular to the surfaces of the sheets of metal 82. In contrast, FIG. 6 further illustrates the Eddy currents 94 in closed loops in a plane perpendicular to the magnetic field 90 and planar with the surfaces of the sheets of metal 82.

Figure 7:
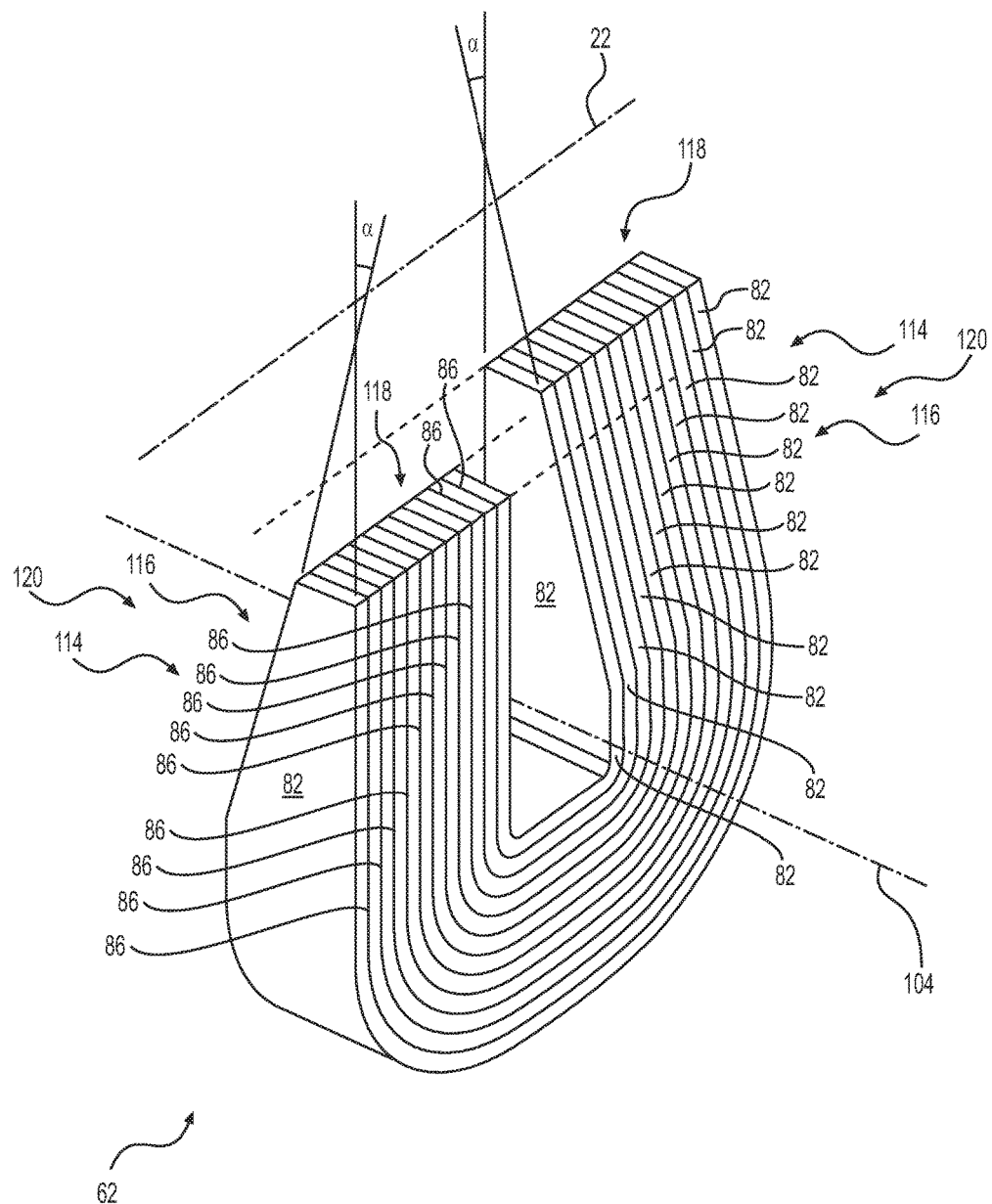
FIG. 7 is an isometric view of a core, in accordance with at least one embodiment of the invention.
Figure 8:
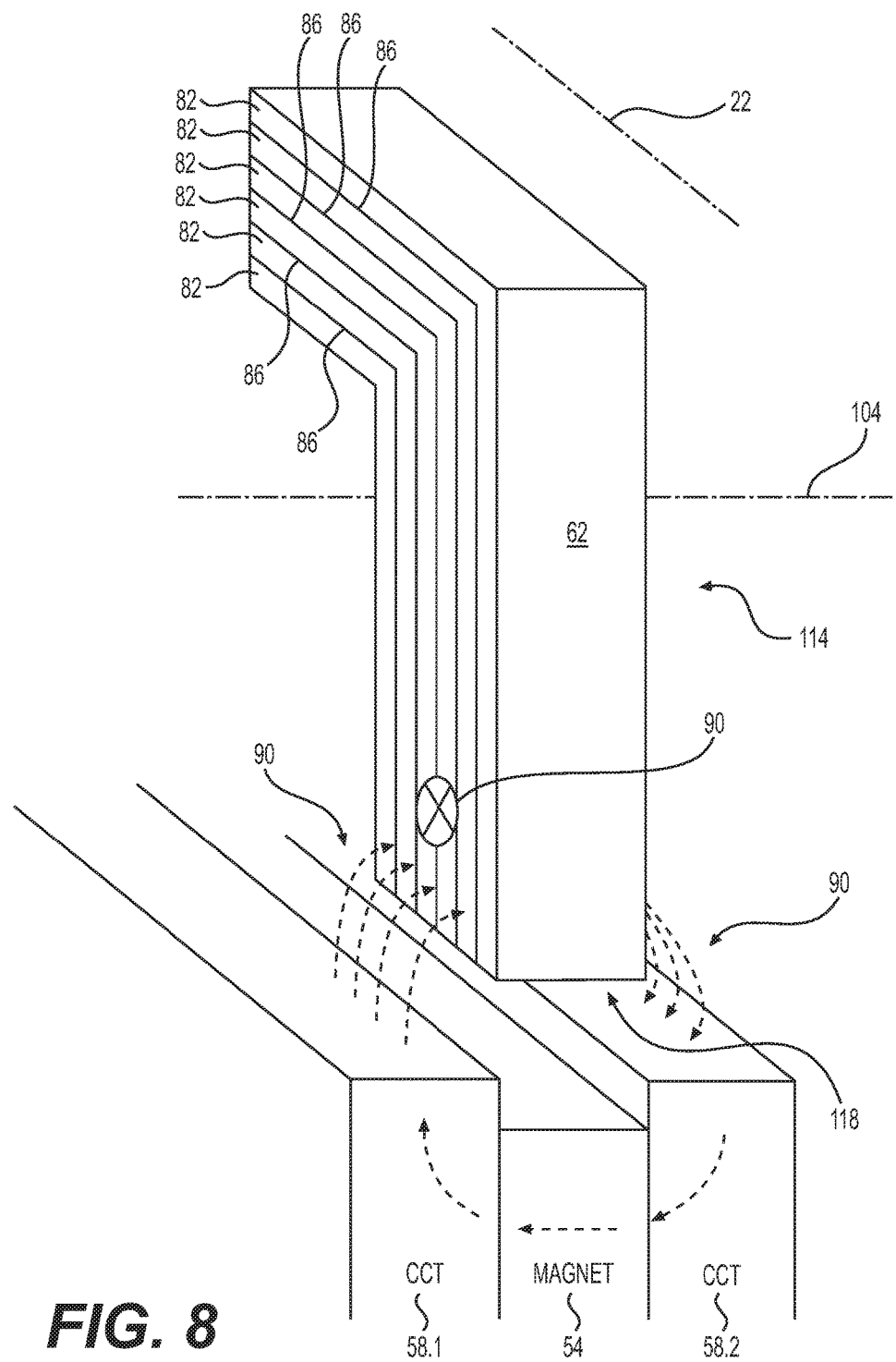
FIG. 8 is an isometric view of the magnetic flux in a core, in accordance with at least one embodiment of the invention.
Figure 9:
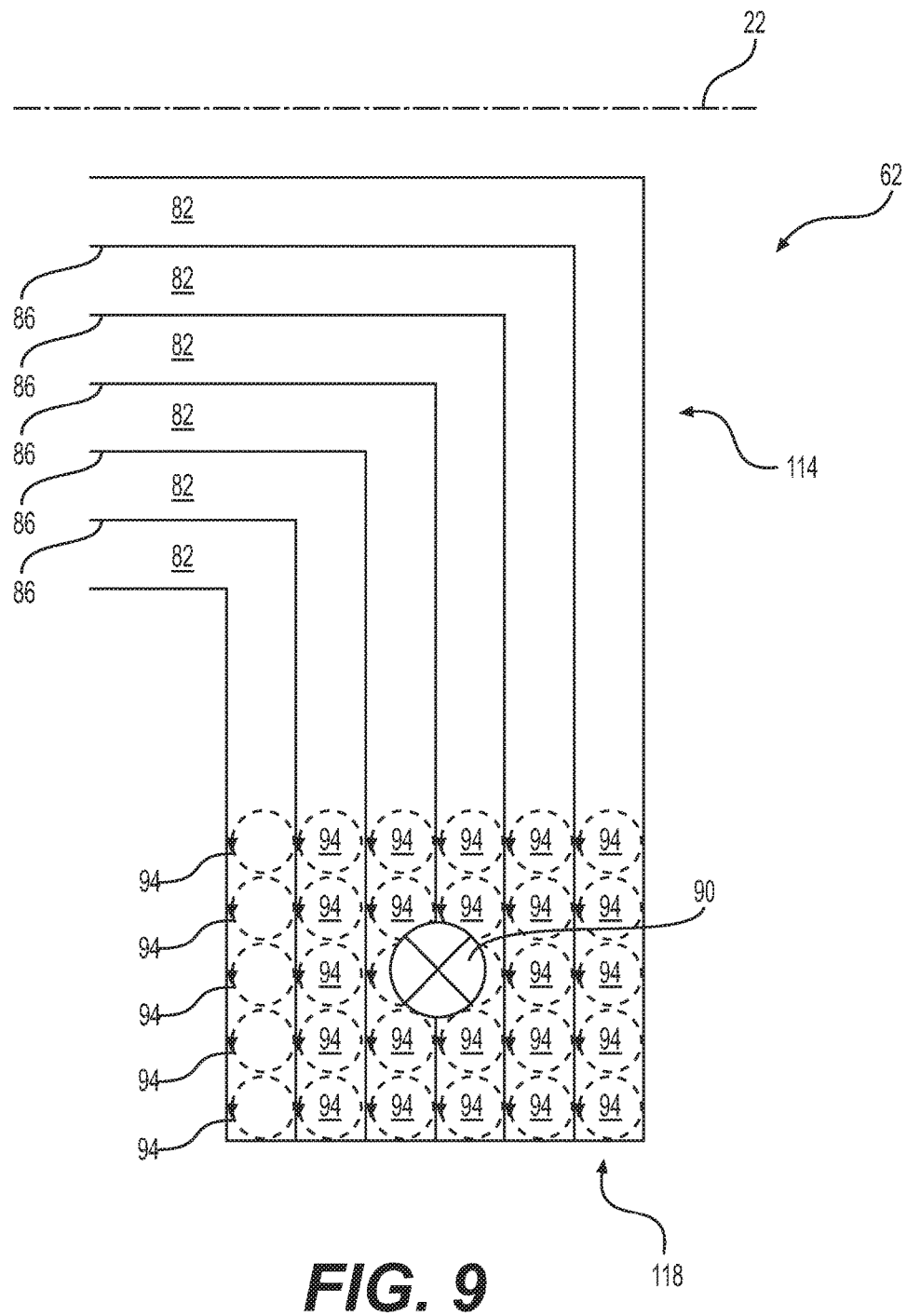
FIG. 9 is an isometric view of the Eddy currents flow in a core, in accordance with at least one embodiment of the invention.

A core 62 manufactured with a plurality of superposed bent sheets of metal 82 about core axis 104, separated with insulating layers 86 stacked in a plane perpendicular with the axis of rotation 22 when the core 62 is operatively assembled in the TFEM, is illustrated in FIG. 7. Each leg 114 includes a leg 114 section reducing portion 120 embodied as an inclined portion 116 that is progressively reducing the section of each of the legs 114 to provide a pair of poles 118 that is smaller than the section of the legs 114. The inclined portion 116 is alternated on opposed sides of the legs 114 thus angularly offsetting the poles 118 of a same core 62 to allow magnetic interaction with adjacent concentrators 58 when operatively assembled with the rotor portion 18. The reducing portion 120 can be adjusted to allow even offset, a distanced offset or partial overlap of the legs' poles 118 in respect with corresponding concentrators 58. The inclined portion 116 is embodied beginning on the core's leg 114, after the bent in the core 62. Alternatively, the inclined portion 116 could be embodied beginning next to the bent in the core's leg 114. In another non-illustrated embodiment, in order to radially reduce the height of the core 62 and get a more compact core 62, the inclined portion 116 is beginning on the core's leg 114, before the bent in the core 62. The inclined portion 116 is illustrated with a rectilinear or planar surface however, a curved surface 120 could alternatively be embodied without departing from the scope of the present invention. Shape variations in the core 62, using the inclined portion 116, can be adjusted to manage the magnetic flux 90 therein. The magnetic flux 90 exits from the concentrator 58.1 to a first leg 114 of the core 62 in a direction orthogonal to the surface of the plurality of superposed sheets of metal 82, as illustrated in FIG. 8. The magnetic flux 90 exits the same leg 114 from the opposed leg's surface back to the adjacent concentrator 58.2. This magnetic flux 90 path occurs when the concentrators 58 are not radially aligned with the cores' 62 legs 114. Otherwise when the concentrators 58 are aligned with the core's 62 legs 114, the magnetic flux 90 enter one leg 114 of the core 62 and exits through the second leg 114 of the core 62. In both positions the magnetic flux 90 path is parallel to each sheet of metal 82 of the core 62. The Eddy currents 94 flow in closed loops within the conductors in planes perpendicular to the magnetic field 90. FIG. 9 further illustrates the Eddy currents 94 in closed loops in a plane perpendicular to the magnetic field 90 and perpendicular with the surfaces of the sheets of metal 82. The Eddy currents 94 are contained in the thickness of the sheets of metal 82 hence producing a plurality of reduced Eddy currents 94 and increasing the efficiency of the core 62.

Figure 10:
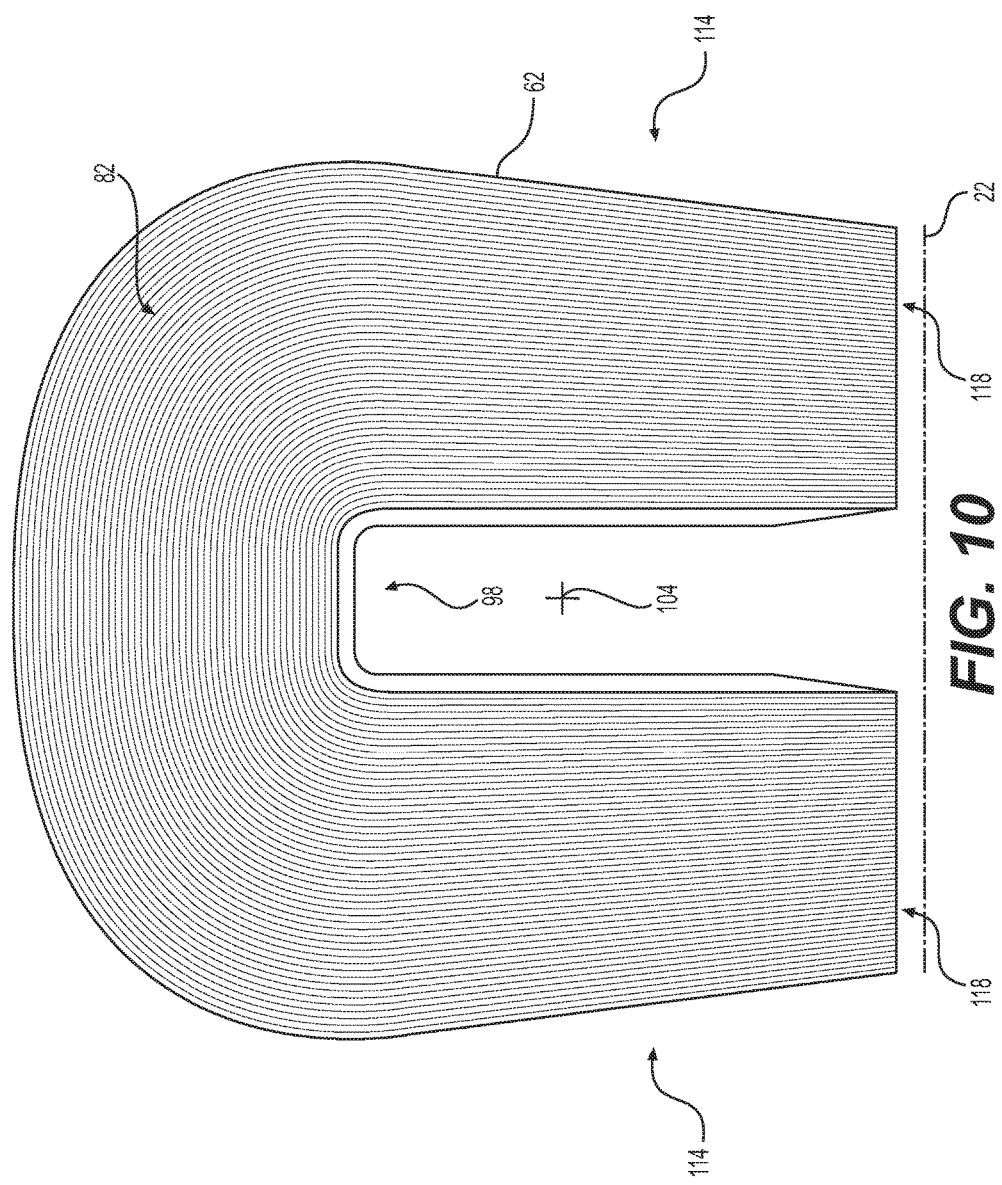
FIG. 10 is a side elevation view of a core, in accordance with at least one embodiment of the invention.
Figure 11:
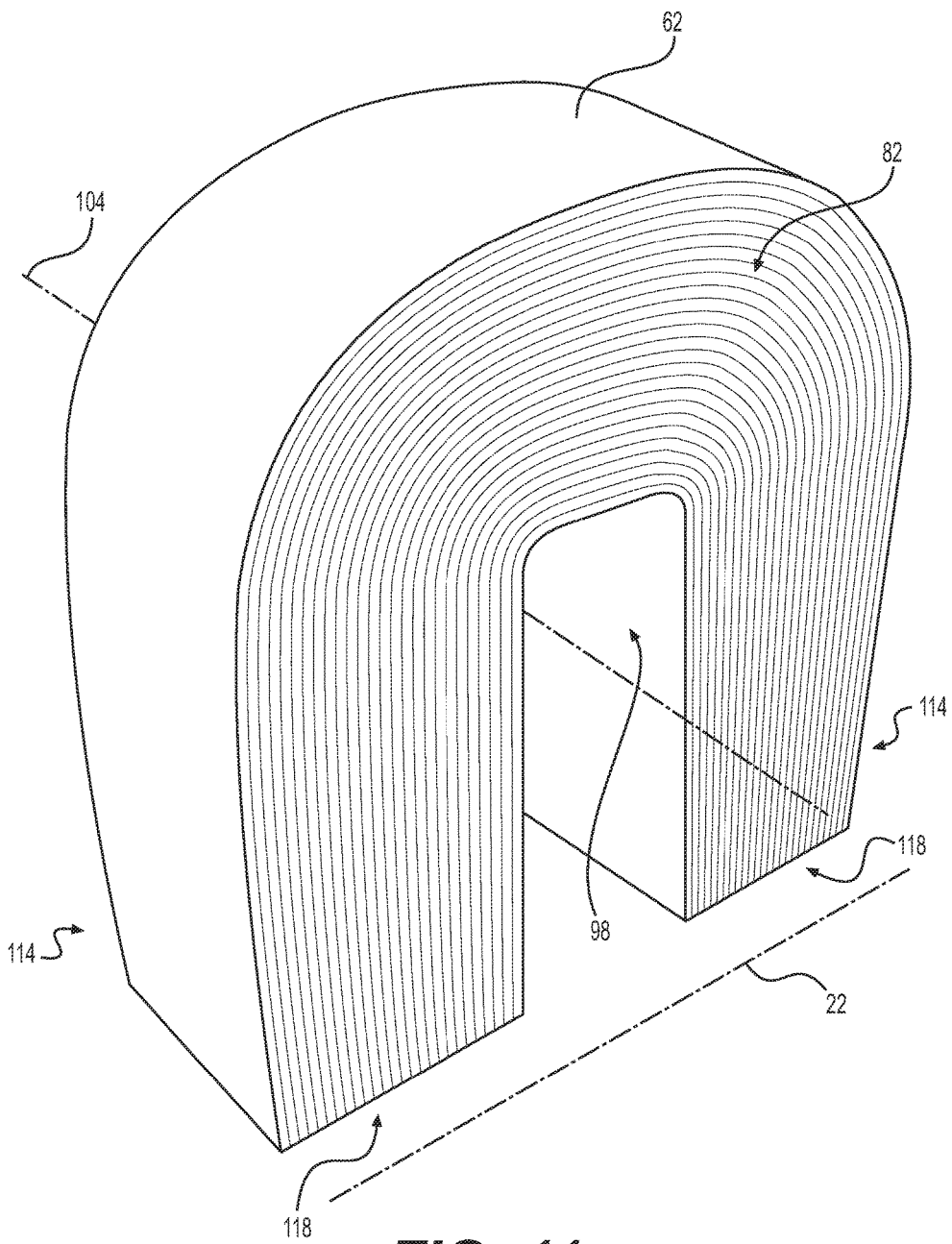
FIG. 11 is an isometric view of a core, in accordance with at least one embodiment of the invention.
Figure 12:
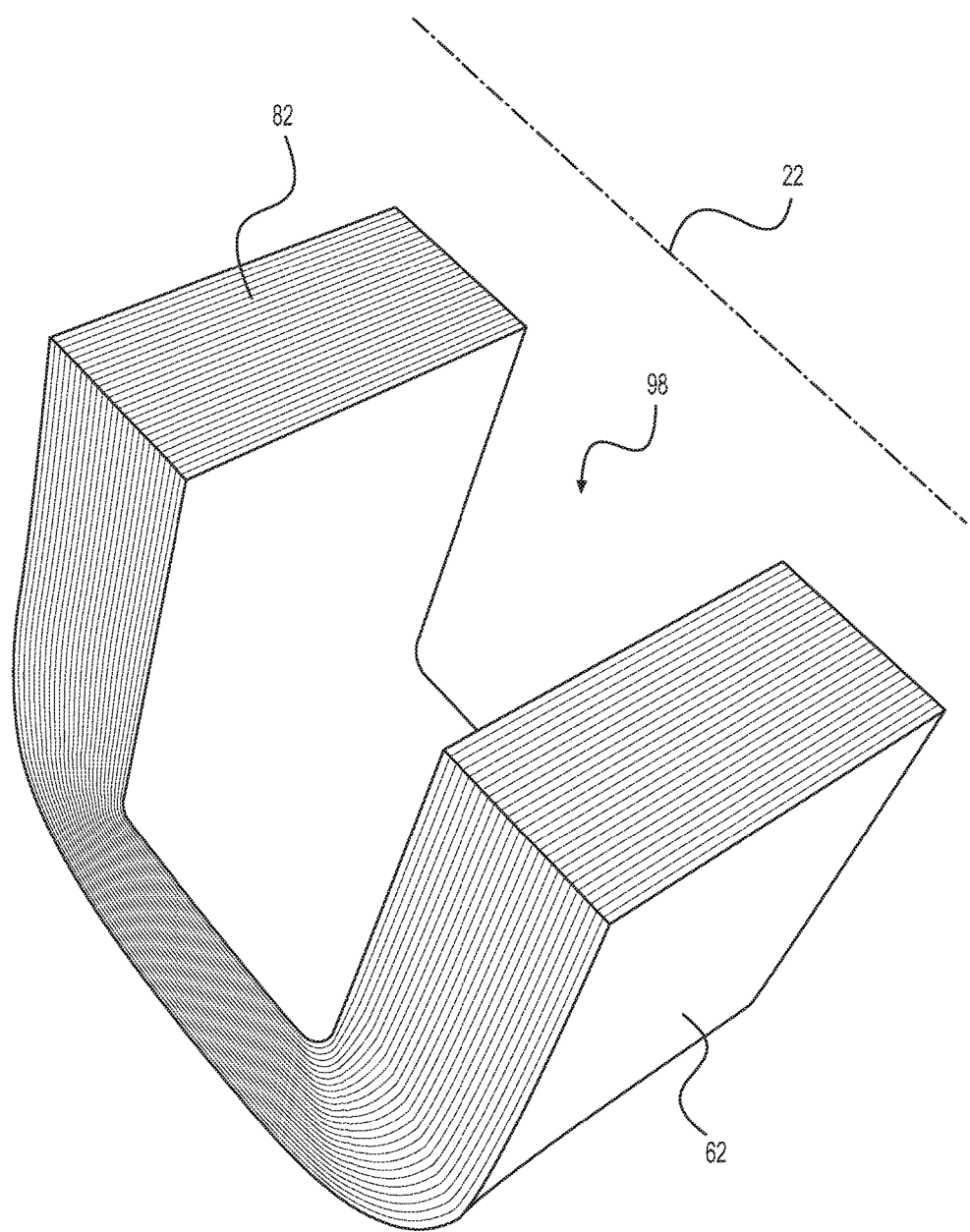
FIG. 12 is an isometric view of a core, in accordance with at least one embodiment of the invention.

FIG. 10, FIG. 11 and FIG. 12 depict an exemplary core 62 manufactured with a plurality of layers of sheets metal 82. From these Figures, one can appreciate the pattern created by the sheets of metal 82 circling around the central opening 98 configured to receive therein the coil 78 (not illustrated in FIG. 10, FIG. 11 and FIG. 12).

Figures 13A, 13B, 13C:
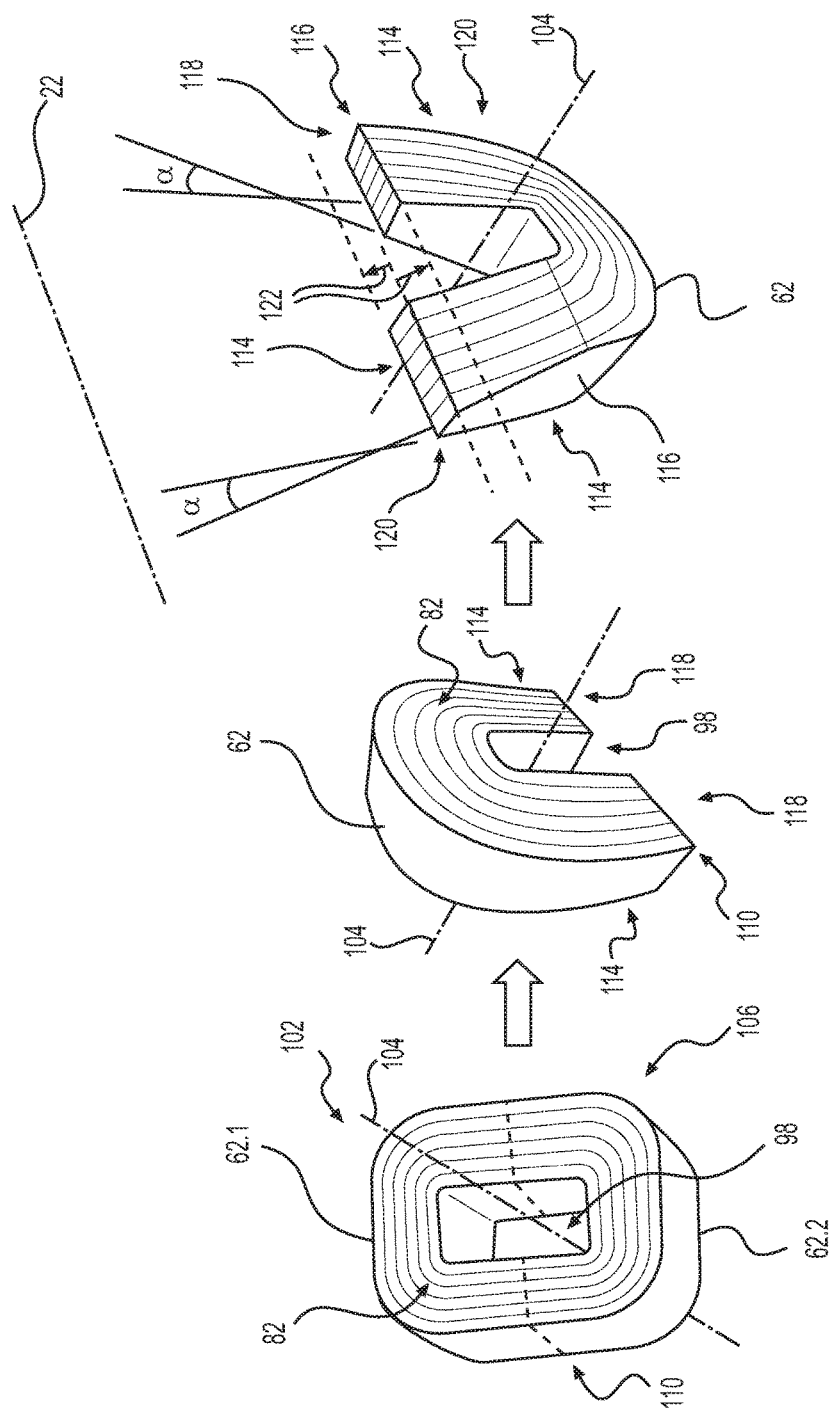
FIG. 13A is an isometric view of a first core manufacturing step, in accordance with at least one embodiment of the invention.
FIG. 13B is an isometric view of a second core manufacturing step, in accordance with at least one embodiment of the invention.
FIG. 13C is an isometric view of a third core manufacturing step, in accordance with at least one embodiment of the invention.
Figure 14:
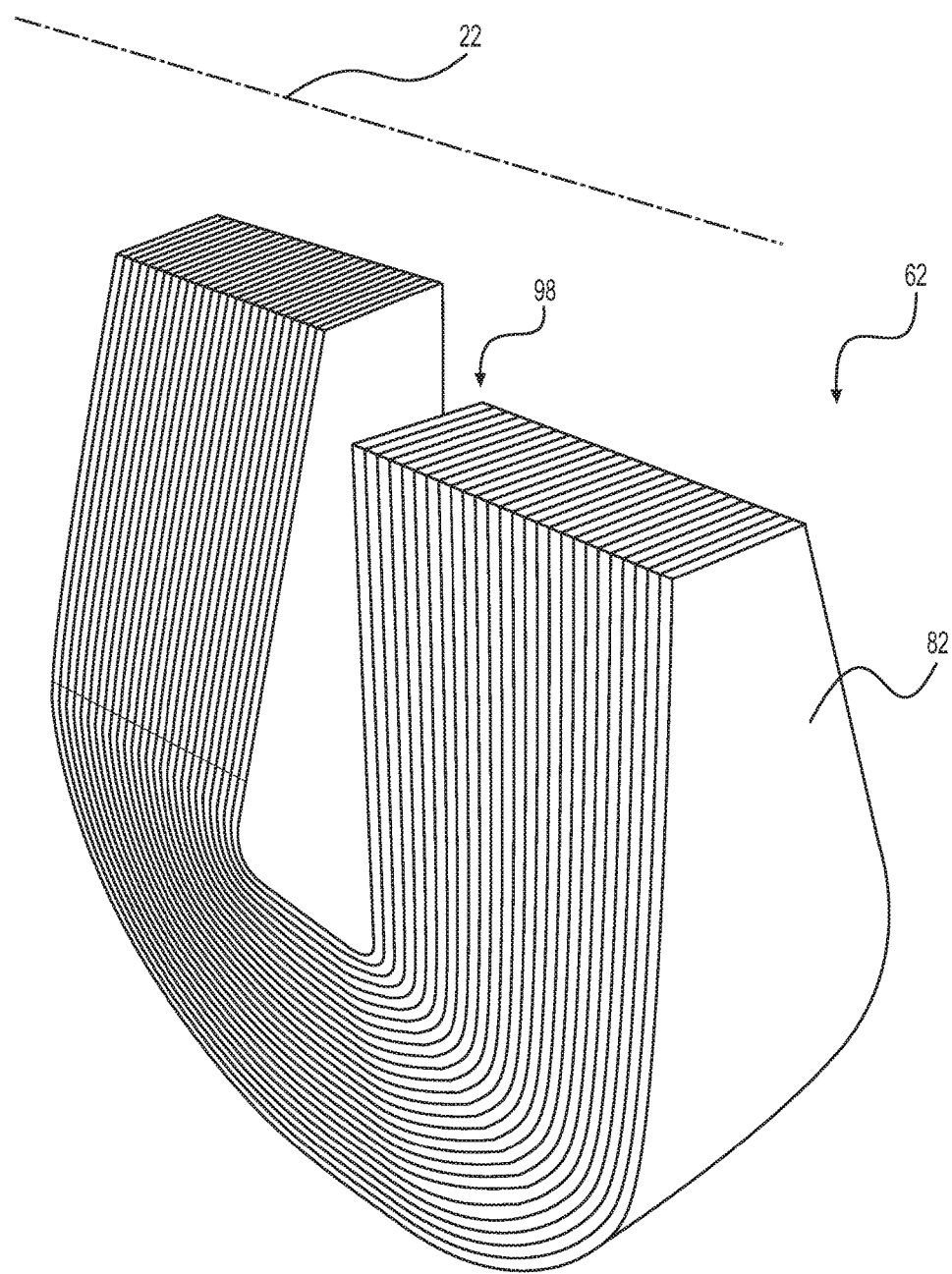
FIG. 14 is an isometric view of a core, in accordance with at least one embodiment of the invention.

A possible manufacturing method for producing a core 62 consists in rolling a strip of sheet metal around a central jig that is sized and designed to leave an opening in the center of the rolled strip of metal 102 forming a double-core 106. The rolled strip of ferromagnetic metal 102 is exemplified in FIG. 13 a) after a first manufacturing step rolling the strip of sheet metal around the central jig. The double-core 106 is then cut in two along its middle plan 110. The result is depicted in FIG. 13 b) showing one half of the double core 106 of FIG. 13 a) that is becoming a core 62. A third step is performed to the core's legs 114 at an angle α as illustrated in FIG. 13 c). The portions of the legs 114 that are cut on opposite sides of the core 62 to form and locate a pair of poles 118 that are axially offset 122, thus not axially aligned. The pair of poles 118 is axially offset 122 to face different concentrators 58 (not illustrated in FIG. 13) and allows movement of the magnetic flux 90 (not illustrated in FIG. 13) through the core 62. The cuttings of the core 62 can be used to adjust the polar offset of the pair of poles 118 and the stator overlap, if desirable. Cutting the core 62 should be made in such a way that no metal residue remains between two layers of sheet of metal 82 hence preventing magnetic shortcuts in the core 62. The core 62 can be etched (etching process) as part of the manufacturing process to ensure no shortcuts are present in the core 62. As mentioned above, a layer of dielectric material, such as electrically insulating resin or varnish, on the faces of the sheets of metal 82 are preventing shortcuts therebetween. An example of a core 62 in its final configuration is depicted in FIG. 14. The cores 62 could be further cut to reduce their width and/or their length to build a more compact TFEM. The strip of sheet metal could be stretched, beyond its elastic deformation domain, to change its thickness in specific region of the core 62. Thickness variations of the sheet metal of the layers of the core 62 can be used to modify, alter and/or adjust the magnetic behavior of the cores 62.

Figure 15:
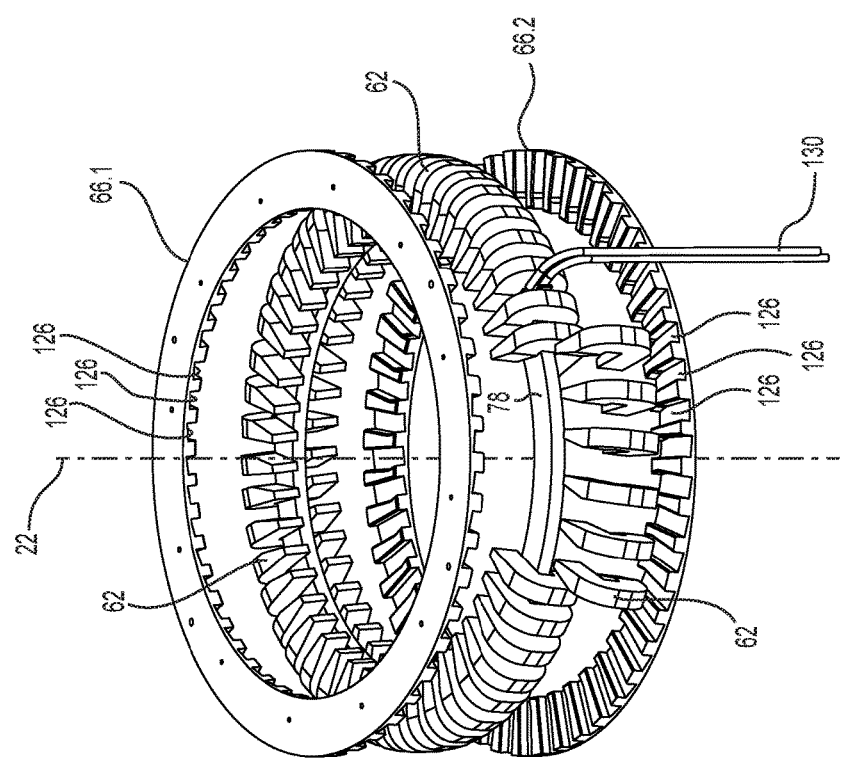
FIG. 15 is an isometric semi-exploded view of a TFEM phase assembly in accordance with at least one embodiment of the invention.
Figure 16:
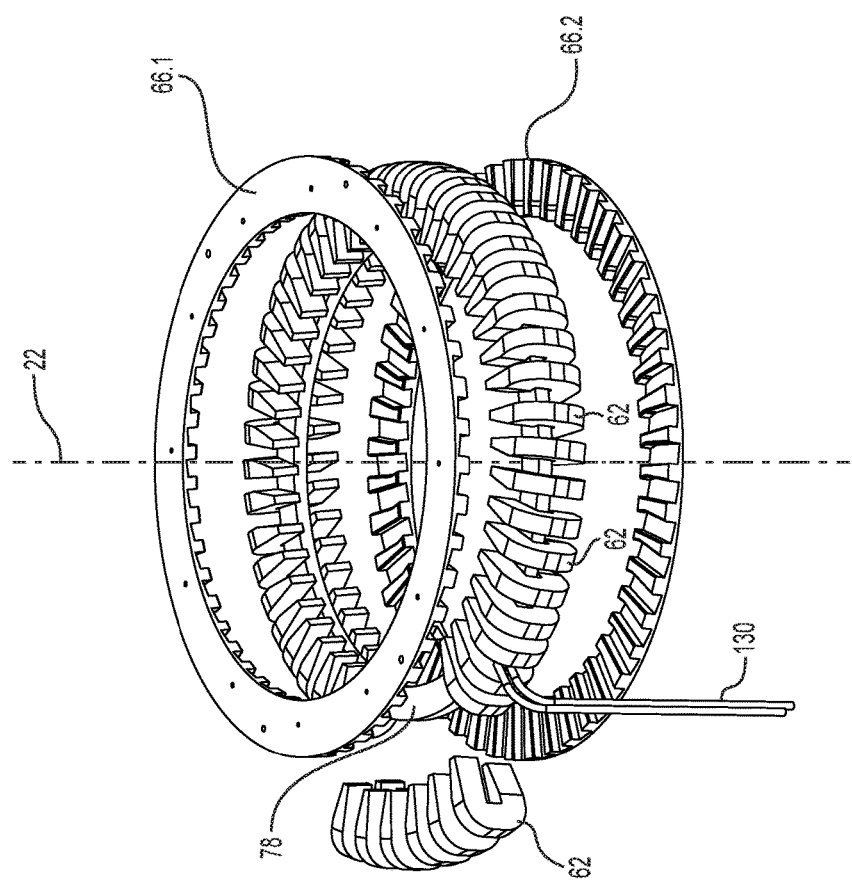
FIG. 16 is an isometric semi-exploded view of a TFEM phase assembly, in accordance with at least one embodiment of the invention.

A circular array of cores 62 is illustrated in FIG. 14, FIG. 15 and FIG. 16 in a predetermined angular array about the axis of rotation 22. The respective positions of each core 62 is determined by corresponding core-receivers 126 disposed in each of the pair of support halve members 66.1 and 66.2. The cores 62 are radially located and secured and their pairs of poles 118 are substantially facing the axis of rotation 22. The toroid coil 78 is assembled in the central openings 98 of the cores 62 and connection wires 130 are extending outside the illustrated assembly to be electrically connected. It can be appreciated the cores 62 are held by the pair of support halve members 66.1 and 66.2 at an angle β thereof, hence providing progressive interaction with the concentrators 58 when operatively assembled with the rotor portion 18 and rotating about the axis of rotation 22.

Figure 17:
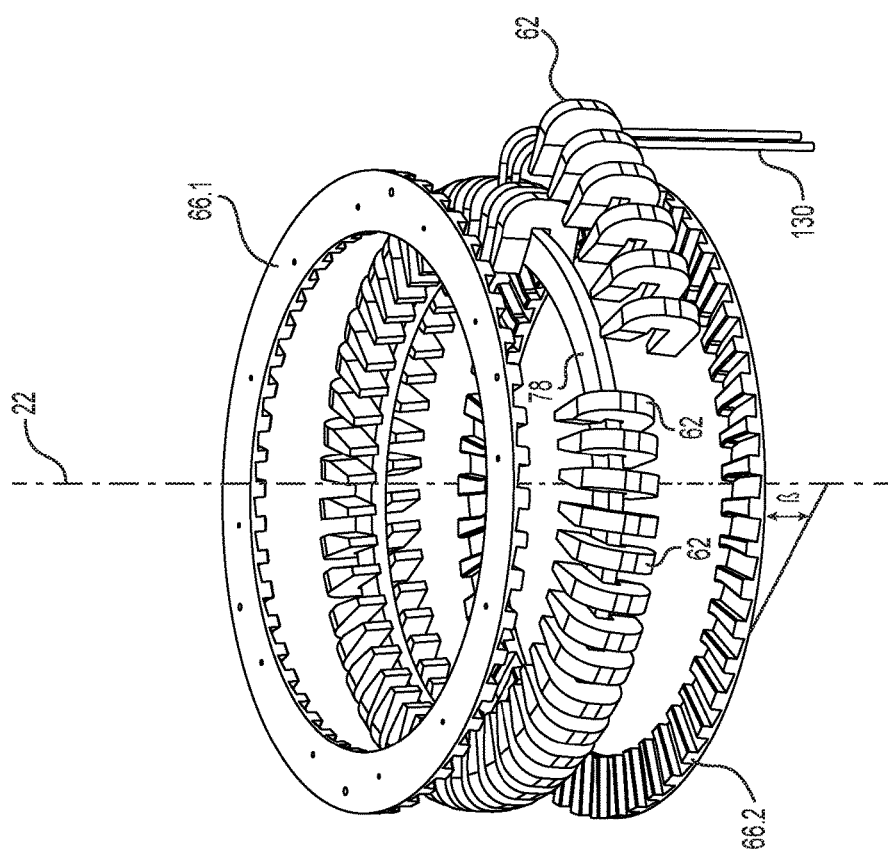
FIG. 17 is an isometric semi-exploded view of a TFEM phase assembly in accordance with at least one embodiment of the invention.
Figure 18:
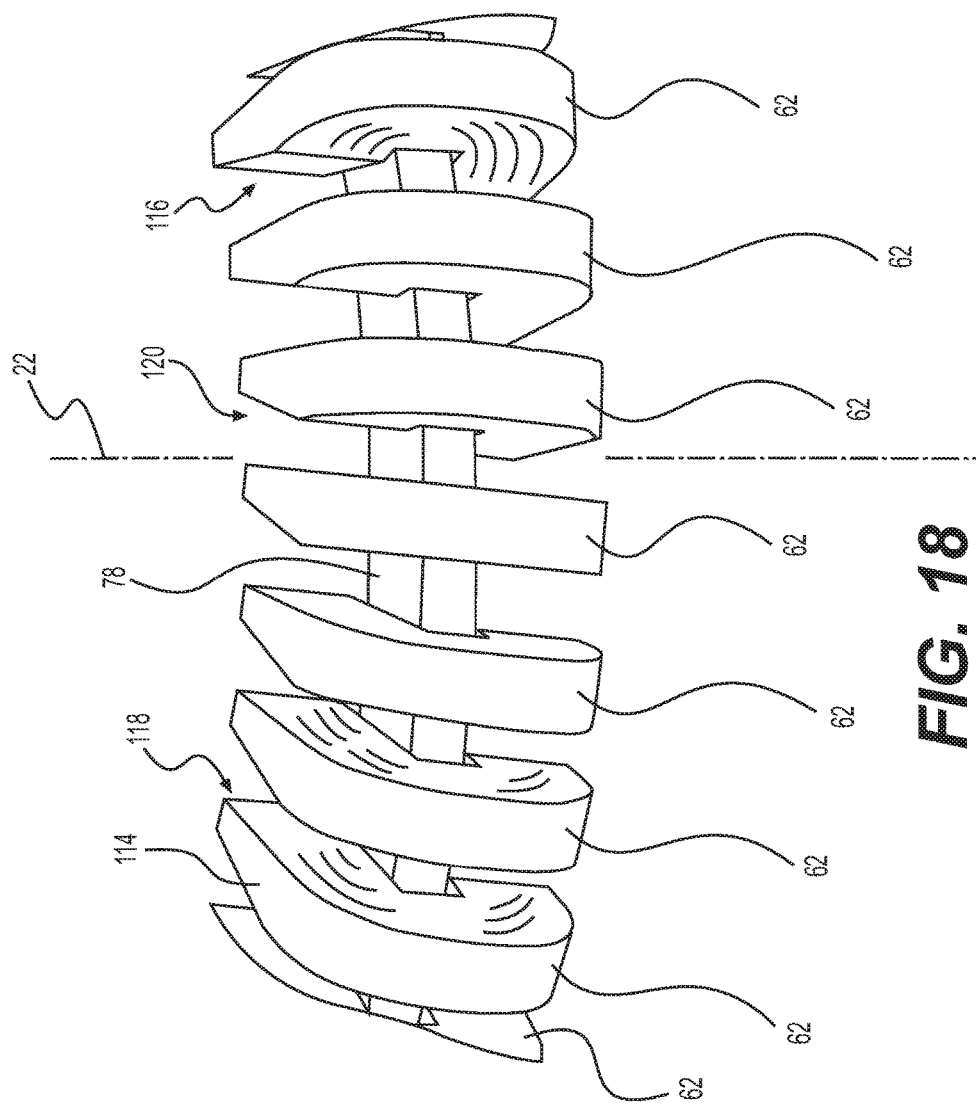
FIG. 18 is a top plan view of a portion of a TFEM phase assembly, in accordance with at least one embodiment of the invention.
Figure 19:
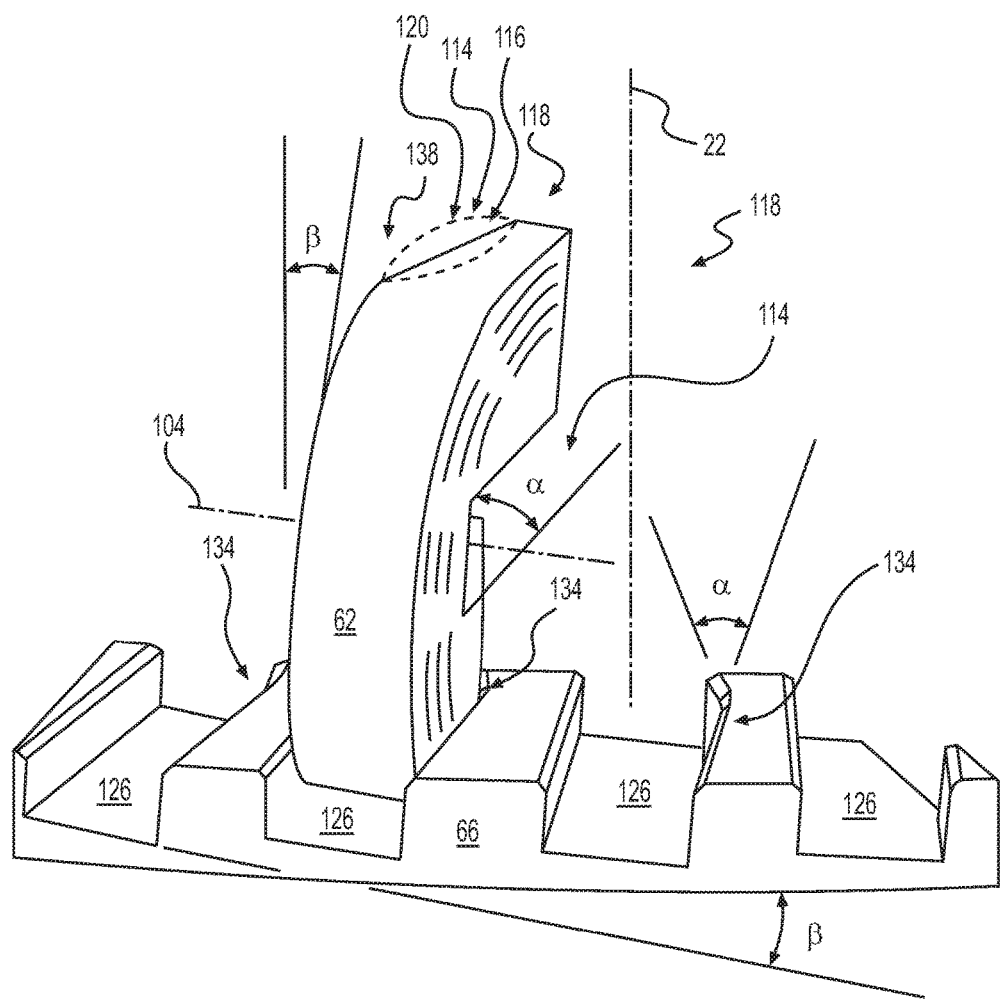
FIG. 19 is a top plan view of a portion of a TFEM phase assembly, in accordance with at least one embodiment of the invention.
Figure 20:
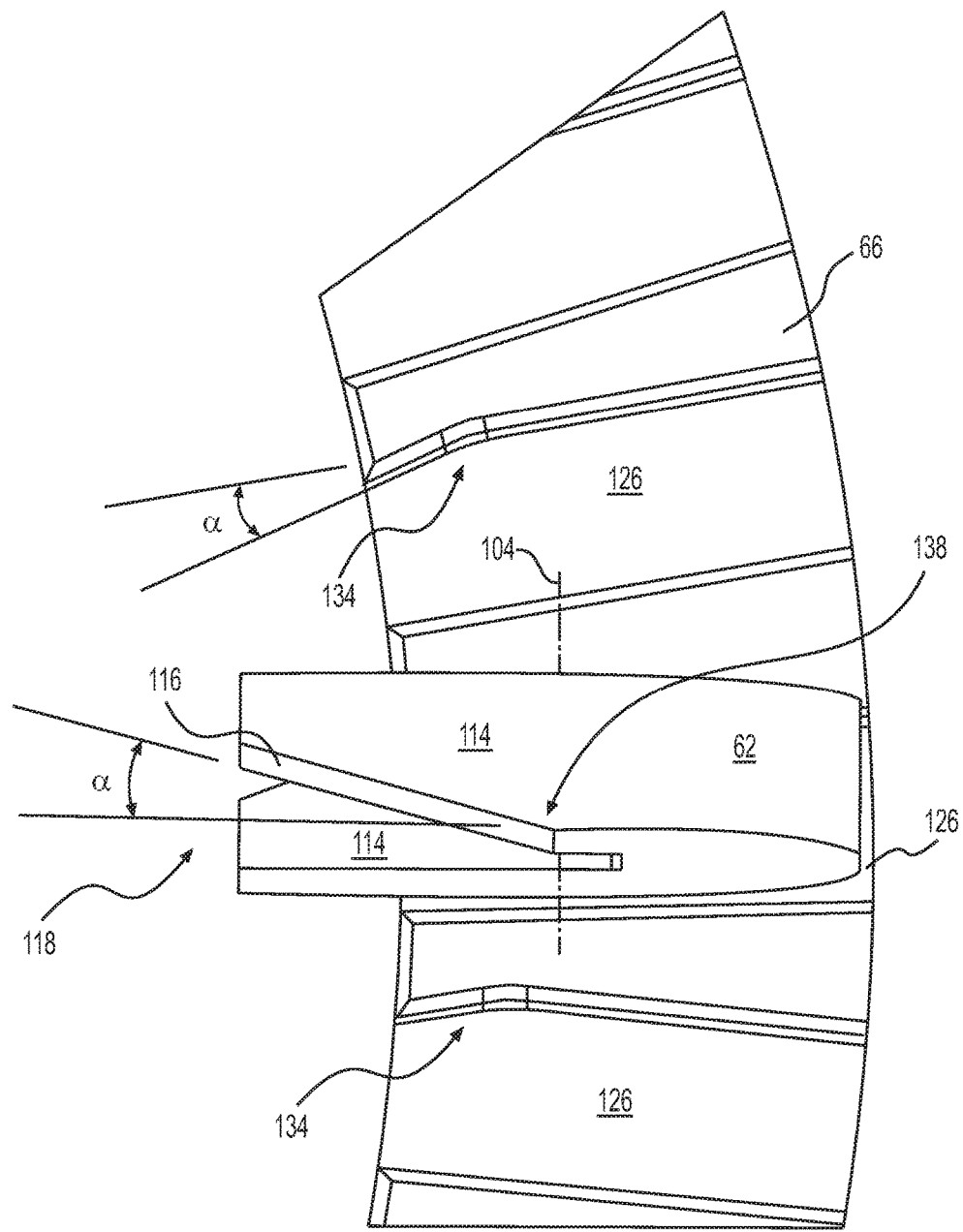
FIG. 20 is a side elevation view of a portion of a TFEM phase assembly, in accordance with at least one embodiment of the invention.
Figure 21:
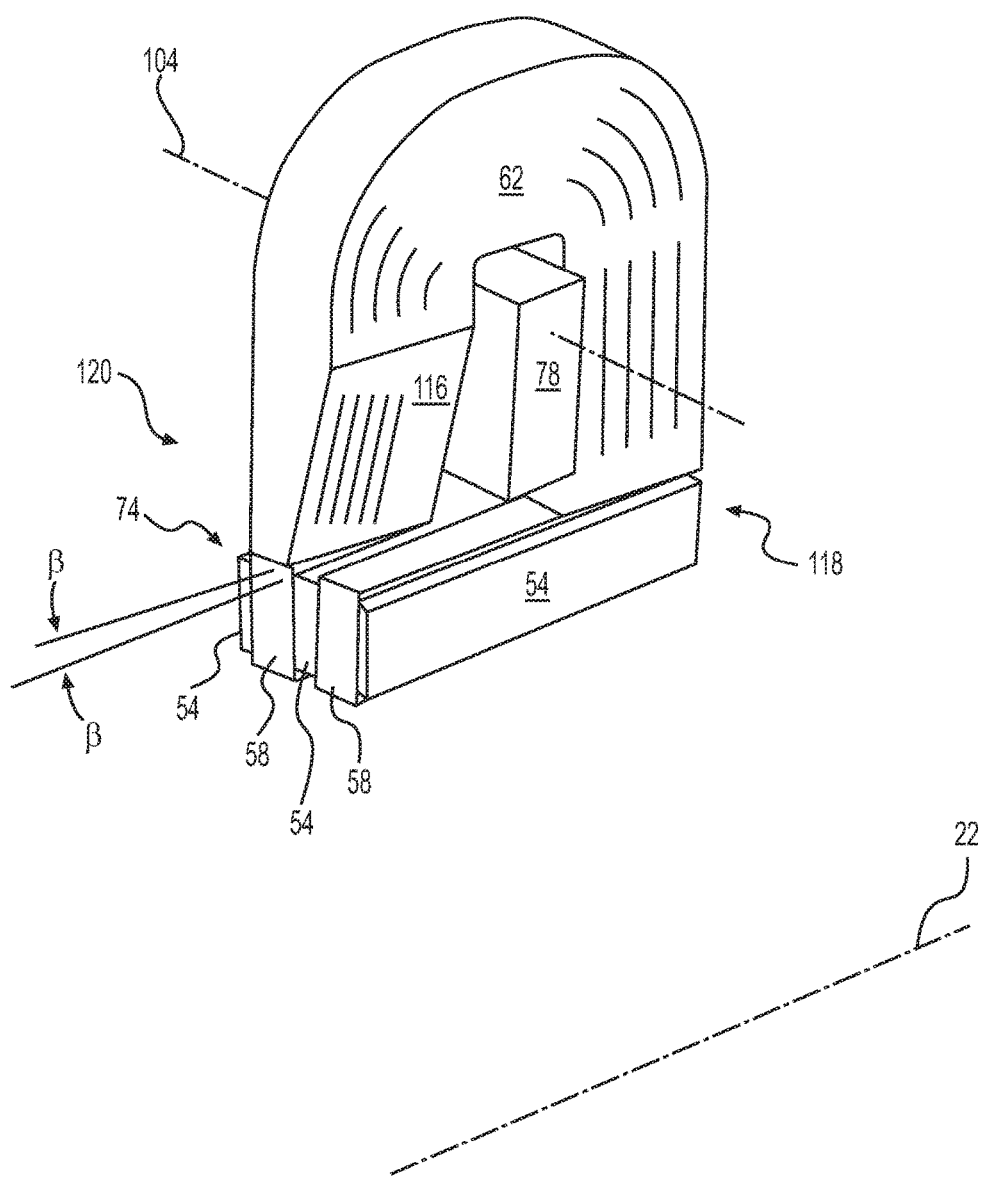
FIG. 21 is an isometric view of a portion of a TFEM phase assembly, in accordance with at least one embodiment of the invention.
Figure 22:
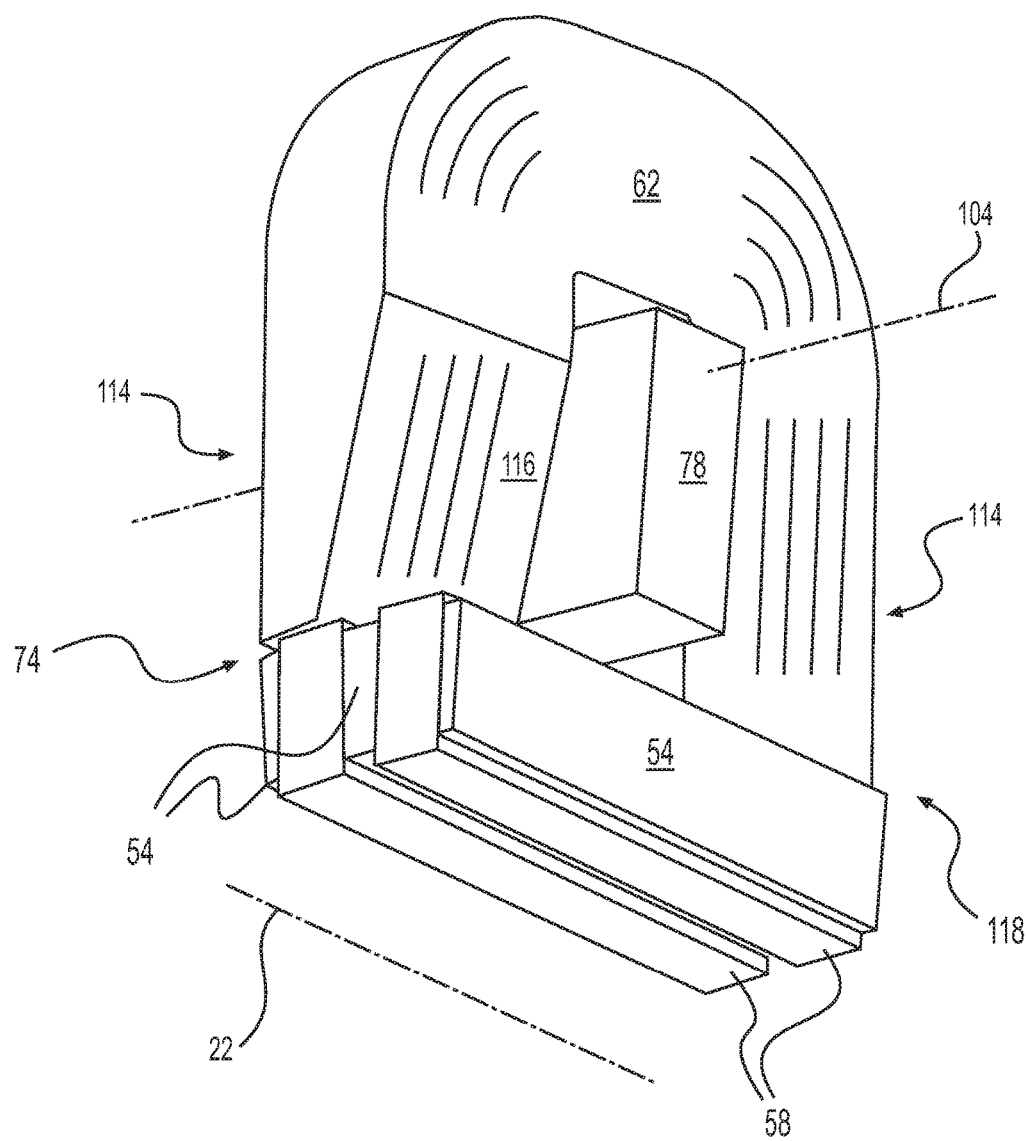
FIG. 22 is an isometric view of a portion of a TFEM phase assembly, in accordance with at least one embodiment of the invention.
Figure 23:
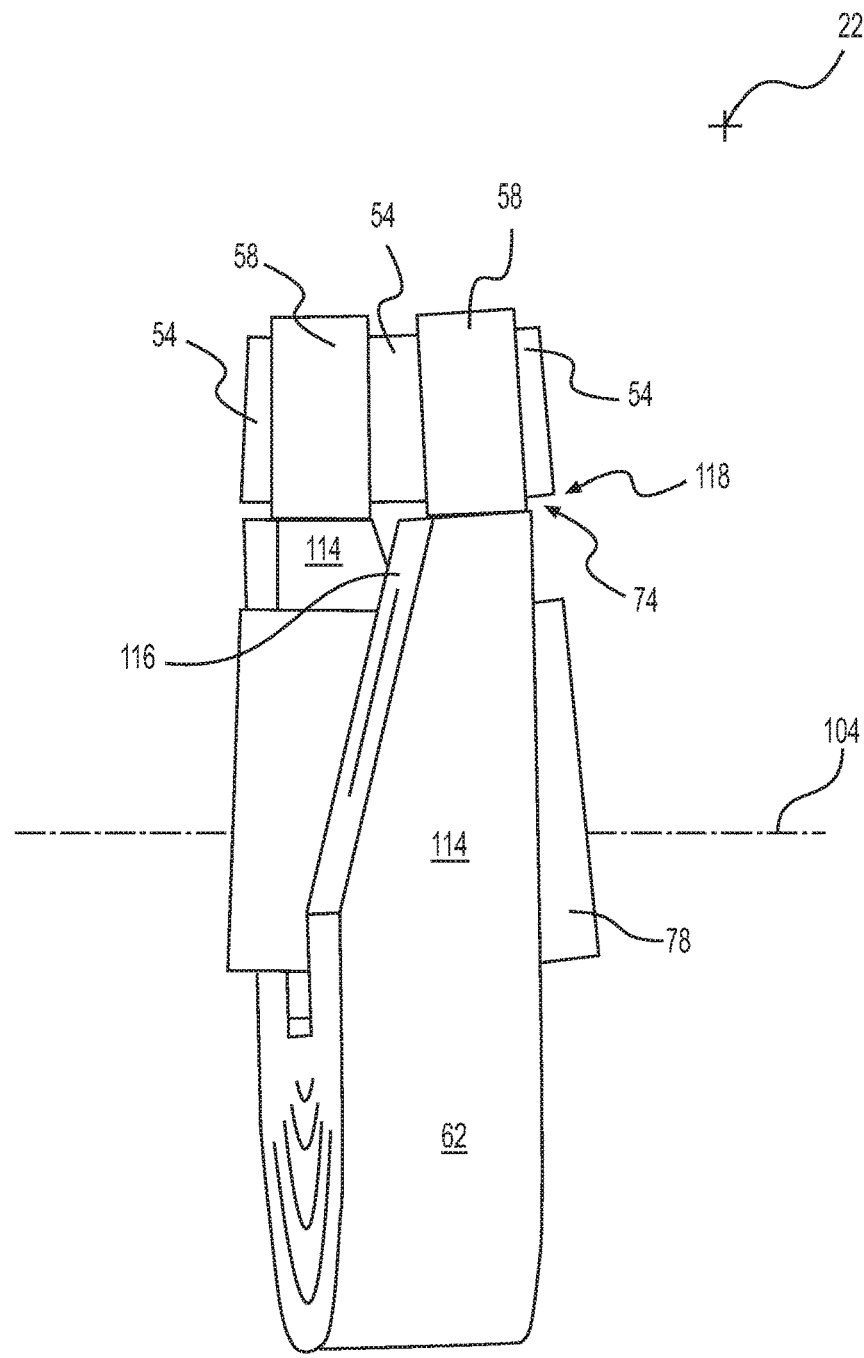
FIG. 23 is a side elevation view of a portion of a TFEM phase assembly, in accordance with at least one embodiment of the invention.
Figure 24:
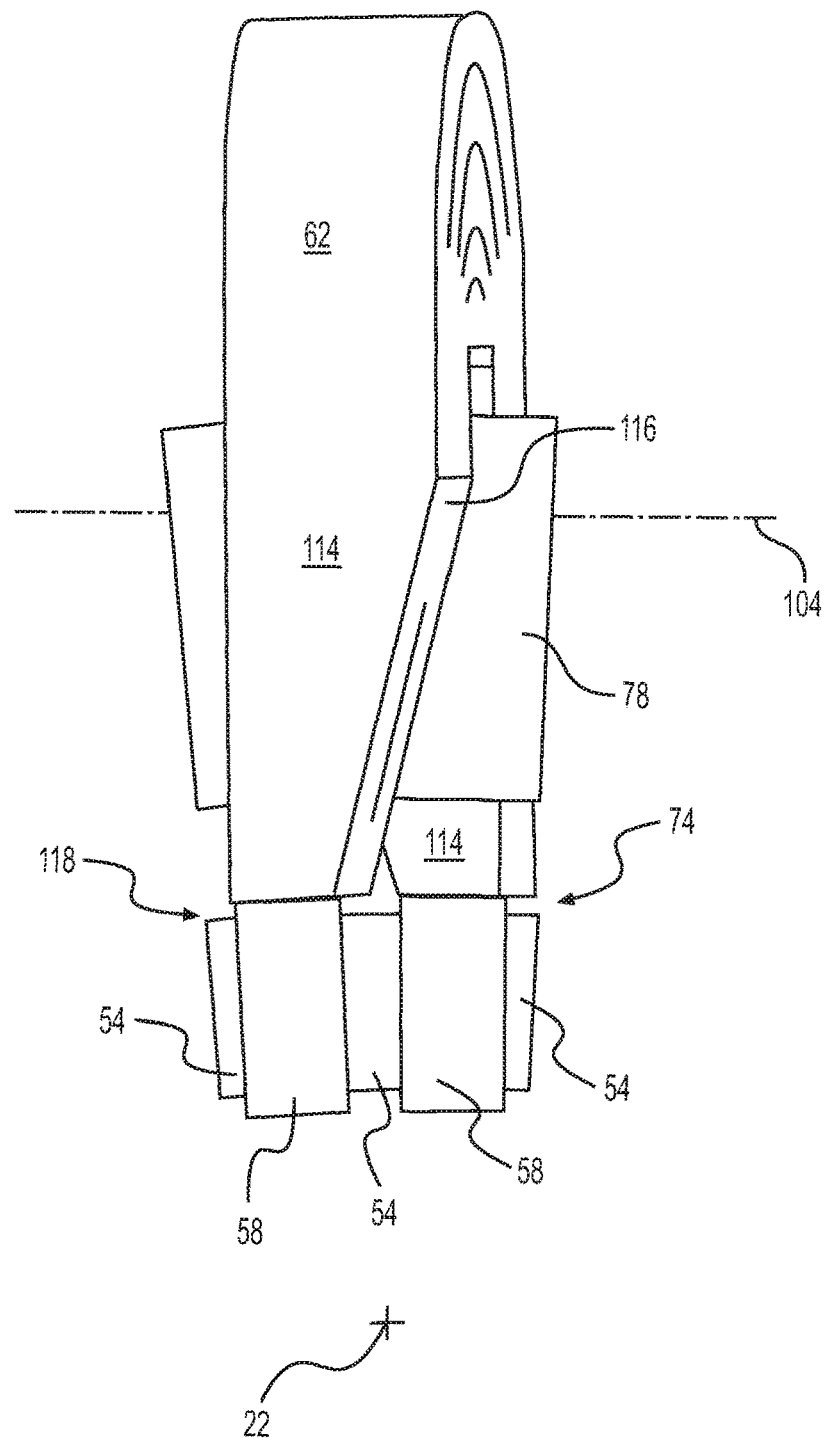
FIG. 24 is a side elevation view of a portion of a TFEM phase assembly, in accordance with at least one embodiment of the invention.

The angle α and angle β are illustrated with more details in FIG. 17 throughout FIG. 19. Again, the angle α is dictated by the cut section on each leg of the core 62 while the angle β is defined by the shape of the core receivers 126 located in the pair of support halve members 66.1 and 66.2. The core receiver 126 comprises an angled portion 134 adapted to match the corresponding angled portion 138 in each of the legs 114 of the core 62. The angled portion 134 of the core receiver 126 and the corresponding angled portion 138 of the legs 114 are fixing the radial distance of each core 62 in respect with the axis of rotation 22. The final distance of the pair of poles 118 in respect with the rotor portion 18 is going to be determined by the final adjustment of the air gap 74, which could be made by honing the central portion of the assembled stator 14 with a boring machine tool. FIG. 20 throughout FIG. 23 show a partial assembly of a core 62 with the toroid coil 78 and in cooperation with a set of magnets 54 and concentrators 58. One can appreciate with the partial assembly of the core 62 that the pair of poles 118 is not simultaneously facing a same concentrator 58 because of the opposite cuts with angle α. The angle β ensures a progressive interaction between the pair of poles 118 and the concentrators 58.

The description and the drawings that are presented above are meant to be illustrative of the present invention. They are not meant to be limiting of the scope of the present invention. Modifications to the embodiments described may be made without departing from the present invention, the scope of which is defined by the following claims:

What is claimed is:

1. A horseshoe shaped core for use in conjunction with an electrical machine, the core comprising:
a body extending in a pair of legs forming a central opening therebetween, each leg ending into a pole thereof, the core including
a cavity along a core axis disposed in the central opening, the core including an axial length parallel with the core axis, the body comprising
a plurality of ferromagnetic sheet material layers, each ferromagnetic sheet layer comprising
a pair of opposed surfaces, the plurality of ferromagnetic sheet material layers being radially stacked one on top of the others with the pair of opposed surfaces being parallel with the core axis and extending along the axial length of the core, wherein the pair of opposed surfaces of each ferromagnetic sheet material layer is continuous along the axial length of the core, each of the legs is further including an inclined portion progressively reducing a portion of each of the ferromagnetic sheet material layers, the inclined portion being disposed in an axial direction with the core axis, an axial length of the poles being shortened by the inclined portions and are axially shorter than the axial length of the core to provide an axial offset between the pair of poles.

2. The core of claim 1, wherein the reducing portion includes an angled planar portion thereof.

3. The core of claim 1, wherein the reducing portion on a first leg of the core is axially opposed to the reducing portion on a second leg.

4. The core of claim 1, wherein the reducing portion on the first leg of the core is opposed to the reducing portion on the second leg to create a poles offset.

5. The core of claim 1, wherein the reducing portion is setting a core overlap in respect with corresponding concentrators.

6. The core of claim 1, wherein adjacent stacked sheet material layers are separated with an insulation layer therebetween.

7. The core of claim 1, wherein the core includes a pair of adjacent bents partially circumventing the core axis.

8. The core of claim 1, wherein at least one ferromagnetic sheet material layer includes a thickness variation thereof.

9. The core of claim 8, wherein the thickness variation is located at the bent in the ferromagnetic sheet material layer.

10. The core of claim 1, wherein the reducing portion is adapted to radially locate the core in respect with an axis of rotation of the electrical machine.

11. A transverse flux electrical machine comprising:
a rotor portion; and
a stator portion, the stator portion comprising a plurality of cores for use in conjunction with the rotor, each of the plurality of cores comprising:
a body extending in a pair of legs forming a central opening therebetween, each leg ending into a Dole thereof, the core including
a cavity along a core axis disposed in the central opening, the core including an axial length parallel with the core axis, the body comprising
a plurality of ferromagnetic sheet material layers, each ferromagnetic sheet layer comprising
a pair of opposed surfaces, the plurality of ferromagnetic sheet material layers being radially stacked one on top of the others with the pair of opposed surfaces being parallel with the core axis and extending along the axial length of the core, wherein the pair of opposed surfaces of each ferromagnetic sheet material layer is continuous along the axial length of the core, each of the legs is further including an inclined portion progressively reducing a portion of each of the ferromagnetic sheet material layers, the inclined portion being disposed in an axial direction with the core axis, an axial length of the poles being shortened by the inclined portions and are axially shorter than the axial length of the core to provide an axial offset between the pair of poles.

12. The transverse flux electrical machine of claim 11, wherein the reducing portion includes an angled planar portion thereof.

13. The transverse flux electrical machine of claim 11, wherein the reducing portion on a first leg of the core is axially opposed to the reducing portion on a second leg.

14. The transverse flux electrical machine of claim 11, wherein the reducing portion on the first leg of the core is opposed to the reducing portion on the second leg to create a poles offset.

15. The transverse flux electrical machine of claim 11, wherein the reducing portion is setting a core overlap in respect with corresponding concentrators.

16. The transverse flux electrical machine of claim 11, wherein adjacent stacked sheet material layers are separated with an insulation layer therebetween.

17. The transverse flux electrical machine of claim 11, wherein the core includes a pair of adjacent bents partially circumventing the core axis.

18. The transverse flux electrical machine of claim 11, wherein at least one ferromagnetic sheet material layer includes a thickness variation thereof.

19. The transverse flux electrical machine of claim 18, wherein the thickness variation is located at the bent in the ferromagnetic sheet material layer.

20. The transverse flux electrical machine of claim 11, wherein the reducing portion is adapted to radially locate the core in respect with an axis of rotation of the transverse flux electrical machine.

* * * * *